United States Patent [19]
Lin et al.

[11] Patent Number: 5,594,788
[45] Date of Patent: Jan. 14, 1997

[54] TELEPHONE SYSTEM AND INTERFACE DEVICE

[76] Inventors: Stephen T. Lin, 20344 Miljevich Dr., Saratoga, Calif. 95070; Bing-Heng Huang, 1217 McCormick La., Costa Mesa, Calif. 92626; Steve Chow, 17522 Cantara St., Northridge, Calif. 91325

[21] Appl. No.: 344,772

[22] Filed: Nov. 23, 1994

[51] Int. Cl.⁶ ............... H04M 1/60; H04M 9/00; H04M 1/00; H04M 3/00
[52] U.S. Cl. .......... 375/167; 379/171; 379/173; 379/377
[58] Field of Search ............... 379/167, 170, 379/172, 179, 173, 182, 184, 377, 188

[56] References Cited

U.S. PATENT DOCUMENTS

| | | | |
|---|---|---|---|
| 4,554,911 | 11/1985 | Armstrong | 379/167 X |
| 4,653,089 | 3/1987 | Eydelman . | |
| 4,723,271 | 2/1988 | Grundtisch | 379/179 X |
| 4,769,837 | 9/1988 | McCormick et al. . | |
| 4,845,743 | 7/1989 | Lutz . | |
| 4,910,764 | 3/1990 | Bowen . | |
| 5,031,210 | 7/1991 | Tanisuchi | 379/167 X |
| 5,086,458 | 2/1992 | Bowen . | |
| 5,425,089 | 6/1995 | Chan et al. | 379/177 X |

Primary Examiner—Wellington Chin
Assistant Examiner—Paul Loomis
Attorney, Agent, or Firm—Claude A. S. Hamrick

[57] ABSTRACT

An improved telephone interface device communicatively couples a local telephone set to an inside telephone wire which, in turn, is communicatively coupled to an outside telephone line from a central office of a telephone service provider. The interface device includes an on-hold switch, a ring detector, a tone decoder, and a coupling switch, all of which are coupled to the bridge via an internal signal line and a control computer. The touch tone decoder receives input tone sequences from the bridge, decodes the tone sequence, and outputs a bit signal to the control computer. The on-hold switch is responsive to a command from the control computer, and is operative to maintain the signal line at a first predetermined voltage. The coupling switch communicatively couples the signal line to a node line. When the node line is coupled to the signal line, a user at the local telephone set may communicate with another user in the home, or with an outside user. The detector compares the voltage on the signal line with a plurality of predetermined voltage ranges. If the voltage on the signal line is within a predetermined voltage range, then the comparator outputs a logic high value to the control computer. A local phone connector is communicatively coupled to the local telephone set and to the node line. During intercom operations, DC power is supplied to the local telephone set via an intercom power switch and the local phone connector.

12 Claims, 18 Drawing Sheets

TELEPHONE SYSTEM AND INTERFACE DEVICE

BACKGROUND OF THE INVENTION

1. Field of the Invention

The present invention relates generally to a device for interfacing a telephone set to a home or a small business telephone network. More particularly, the present invention relates to an interface device that communicatively couples a standard telephone set to a standard telephone wire of a telephone network which is disposed inside the home or small business. Each interface device provides call forwarding, call selection, intercom calling and receiving, and external device control capability.

2. Description of the Prior Art

Small businesses and residences often have multiple telephone sets disposed at various locations throughout the business or home. There is a need, in such environments, for a user of each of the telephone sets to have as much flexibility and capability as possible. For example, call forwarding, call selection, and intercom calling and receiving are some features that would be very desirable in a home or business telephone network.

Call selection allows an outside caller to enter a code which is assigned a particular telephone set, or node, of the network. Call forwarding allows a user of a called telephone set or node, to enter in another code thereby forwarding the incoming call to another user. Intercom calling and receiving allows a first user of a first telephone set to call or receive a call from a second user of a second telephone set of the telephone network.

U.S. Pat. No. 4,769,837 discloses a device for adding an intercom function to a residential or small business phone system using existing telephone equipment and wiring. There is one device per household or business location. That is, the device communicatively couples an outside telephone line (coming from the telephone company) to an internal telephone wire that is routed throughout the home or business structure. Each individual telephone set in the home or business is communicatively coupled to the internal telephone wire.

One shortcoming of the device is that it provides only an intercom feature and does not provide either call forwarding or call selection. Another shortcoming of the device is that since there is only one device for the entire home or business, when an intercom call is made, every telephone set connected to the internal telephone wire will ring. An operational procedure must be created to allow each user to determine whether or not the ringing at their telephone set is meant for them.

U.S. Pat. Nos. 4,653,089, 4,845,743, and 5,086,458 disclose other interface devices that communicatively couple a telephone set to the internal telephone wire of a home or business. However, none of the devices disclosed provide all of the call selection, call forwarding, and intercom calling and receiving features.

SUMMARY OF THE INVENTION

It is therefore an object of the present invention to provide a telephone network system for a home or a small business having flexibility and a wide range of functional capability.

It is a further object of the present invention to provide an interface device for each telephone set in the network, the device providing call forwarding, call selection, and intercom calling and receiving capabilities for a user of the telephone set.

It is another object of the present invention is to provide an improved telephone network system that utilizes existing equipment and wiring, thereby reducing costs.

Briefly, an improved telephone interface device communicatively couples a local telephone set to an inside telephone wire which, in turn, is communicatively coupled to an outside telephone line from a central office of a telephone service provider. The interface device includes a bridge device, an on-hold switch, a detector, an intercom power switch, a control computer, a DC power source, a tone decoder, and a coupling switch. The bridge includes an input line and an output line, the input line communicatively coupled to the outside telephone line. The output line of the bridge is communicatively coupled to the touch tone generator, the on-hold switch, the coupling switch, and the detector means. The touch tone decoder receives input tone sequences from the output line, decodes the tone sequence, and outputs a bit signal to the control computer. The on-hold switch is responsive to a command from the control computer, and is operative to maintain the output line at a first predetermined voltage. The coupling switch communicatively couples the output line to a node signal line. When the node signal line is coupled to the output line, a user at the local telephone set may communicate with another user in the home, or with an outside user. The detector means is a voltage comparator which compares the voltage on the output line with a plurality of predetermined voltage ranges. If the voltage on the output line is within a predetermined voltage range, then the comparator outputs a logic high value to the control computer. A local phone connector is communicatively coupled to the local telephone set and to the node signal line. During intercom operations, DC power is supplied to the local telephone set via the intercom power switch and the local phone connector.

An important advantage of the present invention is that because there is one interface device for each telephone set in the network during an incoming call only the selected telephone set will ring.

Another important advantage of the present invention is that since each of the individual telephone interface devices utilize existing telephone wire, installation of specialized equipment is not required.

Still another advantage of the present invention is that each interface device in the network can provide call selection, call forwarding, intercom calling and receiving, external device control capability.

These and other objects and advantages of the present invention will no doubt become apparent to those skilled in the art after having read the following detailed description of the preferred embodiments which are illustrated in the several figures of the drawing.

IN THE DRAWING

DETAILED DESCRIPTION OF THE PREFERRED EMBODIMENT

General Operation

Figure 1:
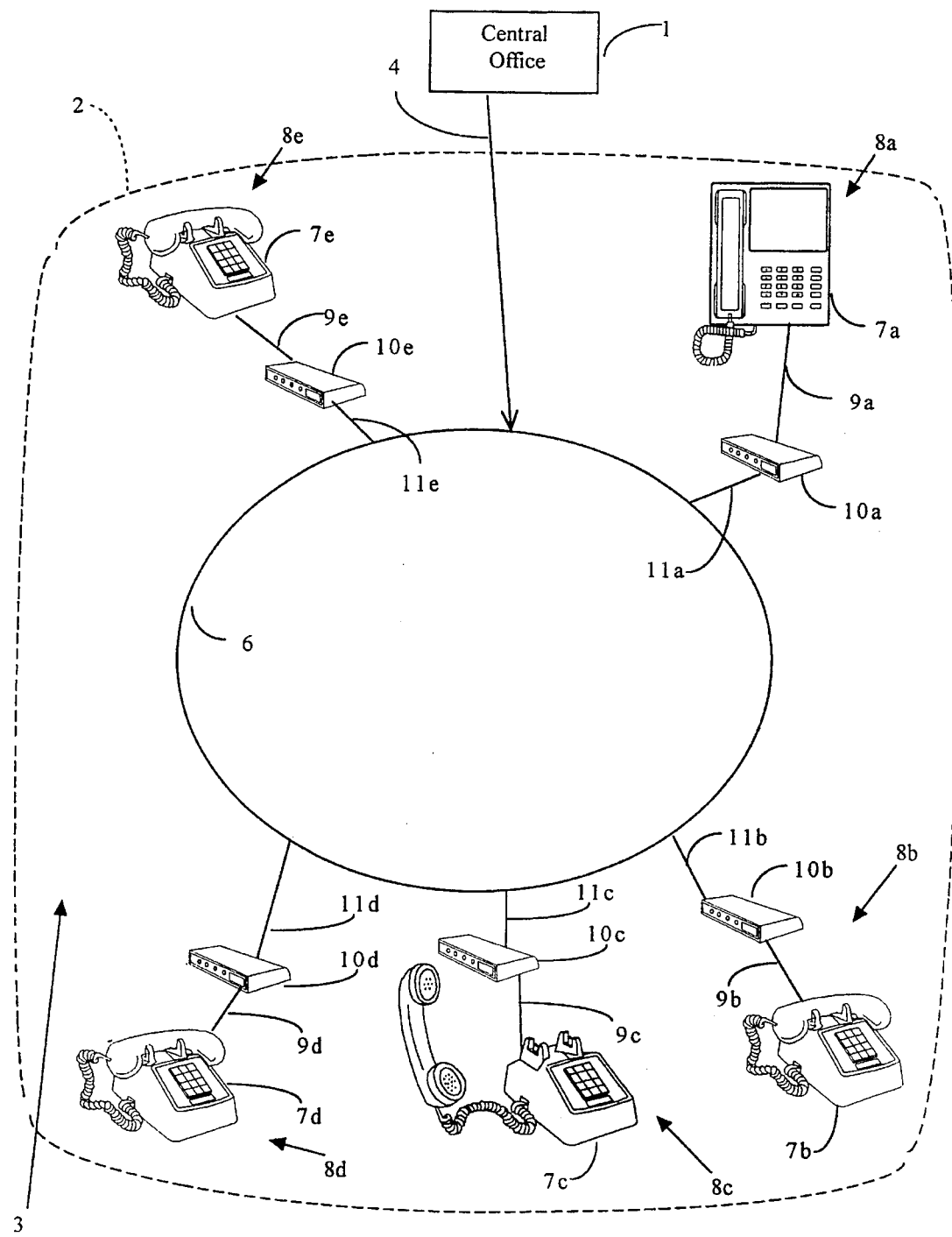
FIG. 1 is a schematic diagram illustrating a telephone network system.

FIG. 1 illustrates a telephone network for a home or small business. A central office 1 of a telephone service provider, is communicatively coupled, via an outside telephone line 4, to a home telephone network 3 which is disposed within a home 2. The central office 1 could be communicatively coupled to a small business telephone network (not shown) which would be substantially similar to the network 3.

The line 4 enters the home 2, and is communicatively coupled to the network 3 via an internal telephone wire 6. The wire 6 is routed to various locations, i.e. rooms (not shown), in the home 2. The network 3 further includes a plurality of nodes 8a, 8b, 8c, 8d, and 8e. Each node 8 includes a telephone set 7 and an interface device 10 of the present invention. The telephone set 7 is communicatively coupled to the interface device 10 via a local line 9, and each interface device 10 is further communicatively coupled to the wire 6 via a line 4. Although a variety of telephone sets 7a, 7b, 7c, 7d, 7e are depicted for each of the nodes, it will be appreciated that each of the nodes 7a, 7b, 7c, 7d, and 7e are substantially identical. Each of the interface devices 10a, 10b, 10c, 10d, and 10e are also substantially identical.

For purposes of the subsequent description, and not as a limitation, the node 8a is designated as the zero node. Also, the term "local node" or "local phone" refers to the node or telephone set that is connected to or associated with a particular interface device via the local phone wire 9. All other nodes, with respect to this node are characterized as "remote nodes" or "remote phones". Thus, for example, with respect to the interface device 10a, node 8a is the local node and all other nodes are remote nodes.

Figure 2:
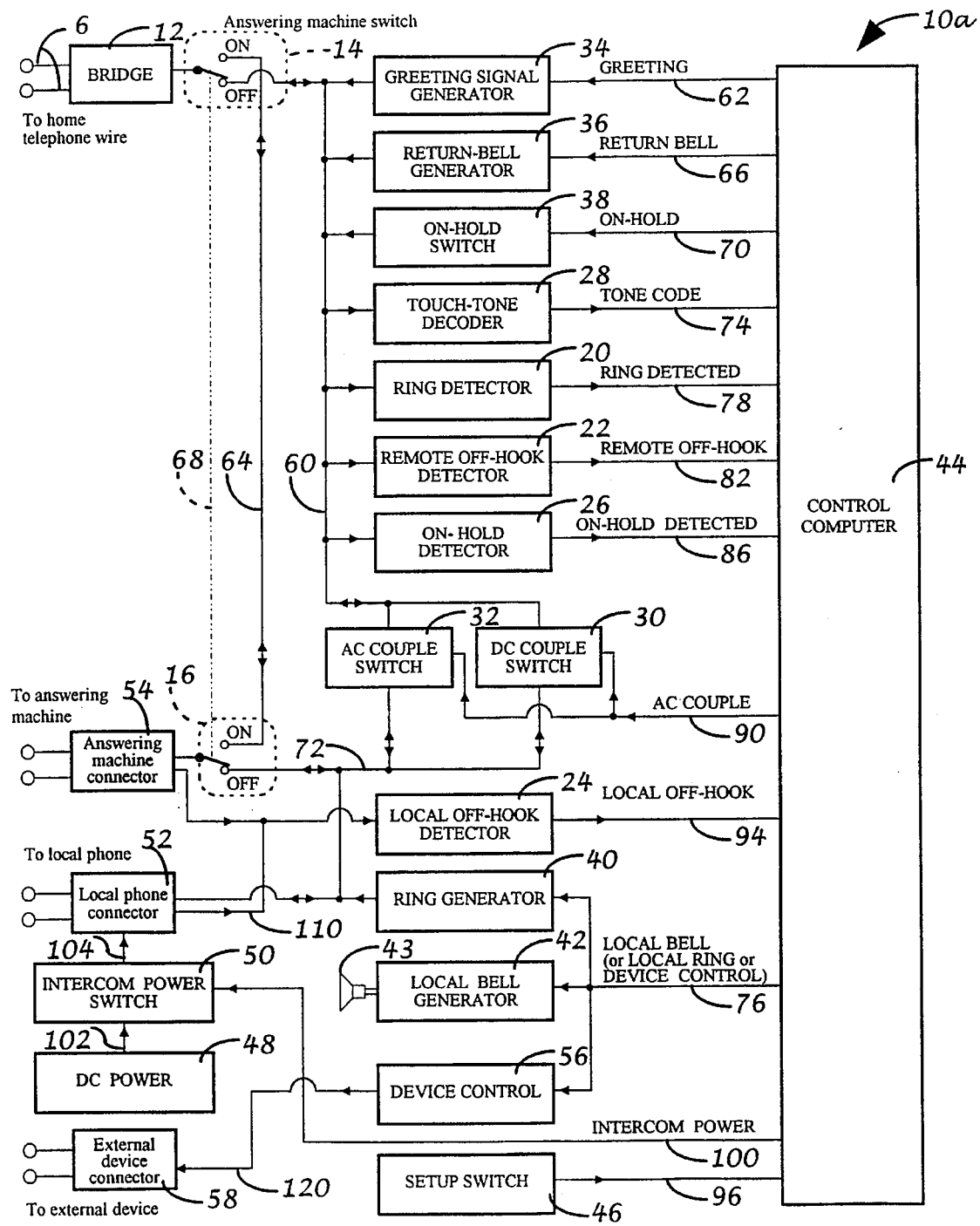
FIG. 2 is a block diagram showing an interface device of the present invention that was depicted in FIG. 1.

FIG. 2 is a block diagram illustrating the components of the interface device 10 of the present invention. Only one device, the interface device 10a, will be described since each of the interface devices are substantially similar. Thus, the node 8a is the local node, and nodes 8b, 8c, 8d, and 8e are the remote nodes.

The interface device 10a includes a bridge 12, answering machine switches 14 and 16, a ring detector 20, a remote off-hook detector 22, an on-hold detector 26, a local off-hook detector 24, a touch tone decoder 28, a DC couple switch 30, and an AC couple switch 32. The device 10a further includes a greeting signal generator 34, an on-hold switch 38, a ring generator 40, a local bell generator 42, a control computer 44, a set up switch 46, DC power source 48, intercom power switch 50, a local phone connector 52, an answering machine connector 54, a device control 56, and an external device connector 58. In the preferred embodiment, the answering machine connector 54, switches 14 and 16, and the greeting signal generator 34 are included with only the node associated with the zero node and generally not included with every device for every node.

The bridge 12 is communicatively coupled, through the switch 14 and a network signal line 60, to each of the greeting signal generator 34, the return bell generator 36, the on-hold switch 38, the touch tone decoder 28, the detectors 20, 22, 26, and the AC and DC couple switches 32 and 30.

The bridge 12 is communicatively coupled to an answering machine (not shown), via the switches 14 and 16, the connector 54, and an answering machine signal line 64. The switches 14, 16 are linked by an actuator 68 such that when switch 14 is open (or closed), the switch 16 is also open (or closed).

The greeting signal generator is interposed between the control computer 44 and the bridge 12, and is communicatively coupled to the computer 44 by a greeting command signal line 62, Similarly, each of the return bell generator 36, the on-hold switch 38, the touch tone decoder 28, the ring detector 20, the remote off-hook detector 22, and the on-hold detector 26 are communicatively coupled to the computer 44 via a greeting command signal line 62, a return bell signal line 66, an on-hold command signal line 70, a tone code signal line 74, a ring signal detected signal line 78, a remote off-hook signal line 82, and an on-hold detected signal line 86, respectively.

Each of the DC couple and the AC couple switches 30 and 32 are communicatively coupled to the bridge 12, via the network signal line 60. Also, each of the DC and AC couple switches 30, 32 are communicatively coupled to the computer 44 by an AC couple command signal line 90, and are coupled to each of the switch 16, the connector 52, the local off-hook detector 24, and the ring detector 40, by a node signal line 72. Also, the ring detector 40, the local phone connector 52, the answering machine connector 54, and the local phone off-hook detector 24 are communicatively coupled together by a local phone ring signal line 110.

The control computer 44 is communicatively coupled to the local off-hook detector 24, the intercom power switch 50, and the setup switch 46 by a local off-hook signal line 94, an intercom power command signal line 100, and a setup signal line 96, respectively. Further, a command signal line 76 communicatively couples the computer 44 to each of the ring generator 40, the local bell generator 42, and the external device control 56.

The DC power 48 is communicatively coupled to the intercom power switch 50 by a DC power signal line 102. The intercom power switch 50 is coupled, via an intercom power signal line 104 to the connector 52 which is connected to the phone set 8a (FIG. 1).

Finally, the device control 56 is communicatively coupled, via a device control signal line 120, to an external device connector 58 which is connected to an external device (not shown). The external device may be any one of a number of devices such as a facsimile machine, a personal computer, an answering machine, or another phone.

Each device 10 is capable of performing various functions or operational modes. Each device 10 can handle an incoming call, perform call selection and call forwarding, control a device which is external to the network 3, control an answering machine, and perform intercom calling and receiving. FIGS. 3–6 are block diagrams depicting which portions of the device 10 are utilized to perform these functions.

Figure 3:
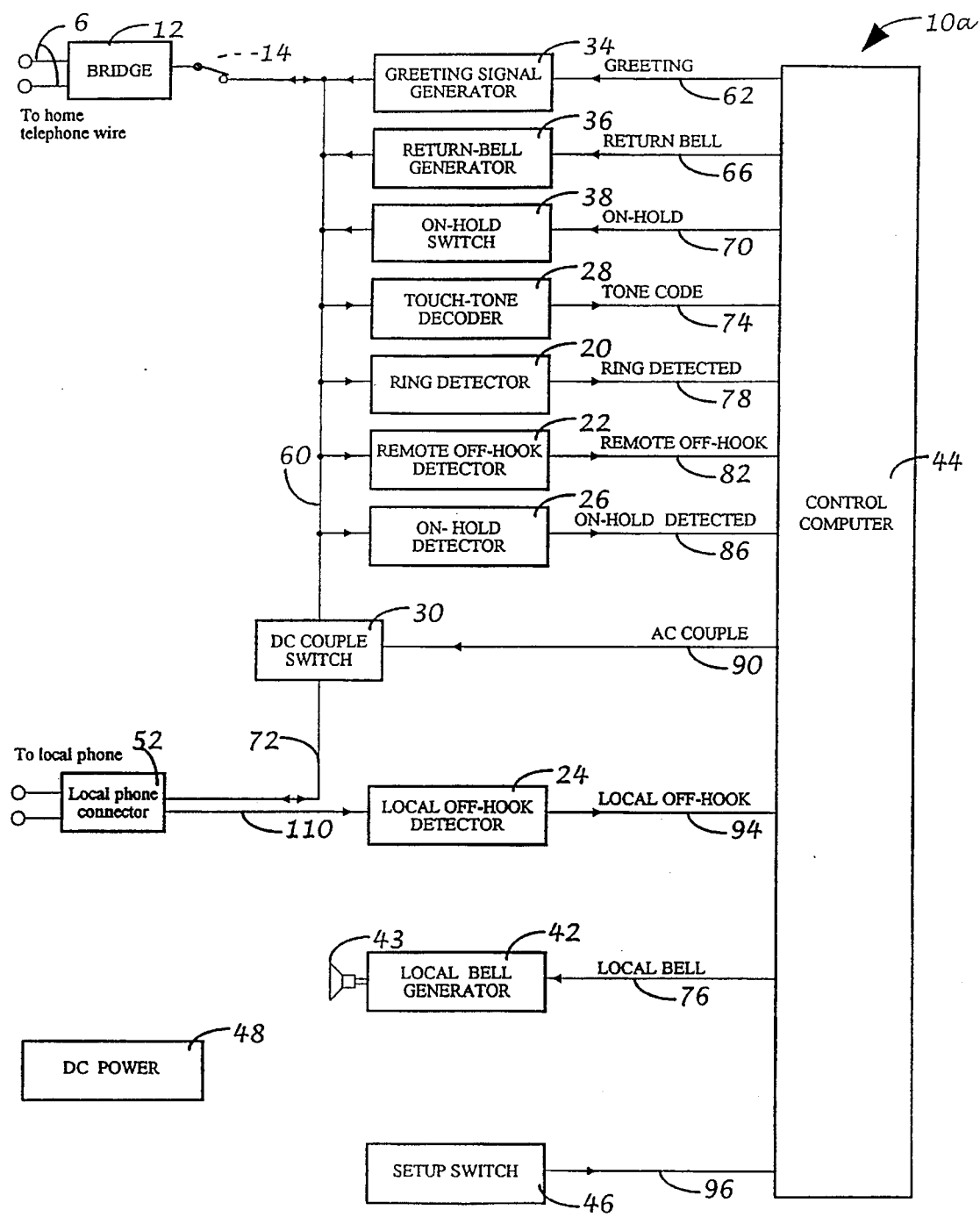
FIGS. 3–6 are block diagrams illustrating various operational modes of the interface device.

FIG. 3 is a block diagram depicting call selection and call forwarding functions. Before operating, a unique extension code is assigned to each interface device 10a, 10b, 10c, 10d, and 10e of the network 3. A setup switch 46 is used to enter in an unique extension code to each computer 44 of each device 10a, 10b, 10c, 10d, and 10e.

When an incoming call arrives, each interface device in the network detects the ring signal, generated by the central office 1 (FIG. 1), with its ring detector 20. In addition, the interface device 10a of zero node (i.e. node 8a) turns on its on-hold switch 38 so that the central office 1 will stop transmitting a ring signal over the wire 6. The interface device 10a then turns on its greeting signal generator 34 for a predetermined period of time (e.g. 30 seconds). The outside caller (a caller outside the network) hears the greeting message and is instructed on the features of the network 3.

All interface devices of the network monitor the wire 6 for a touch-tone input sequence entered by the outside caller at his telephone set. If there is no touch tone input sequence entered after a predetermined period of time (e.g. 60 seconds) then all interface devices return to idle. If there is a touch-tone input sequence entered, then each interface device decodes the input sequence using its touch-tone decoder 28 and compares the decoded input sequence with the unique extension code that was previously assigned to that particular interface device. For example, if the decoded input sequence matches the unique extension code assigned to node 8a, then device 10a begins a call selection mode and each of the interface devices at the other nodes 8b, 8c, 8d, and 8e enter a call forwarding mode.

Assume, for example, that the node 8a is the called node, i.e. the device 10a of the node 8a is in the call selection mode of operation. The on-hold switch 38 and the local bell generator 42 of the device 10a are turned on to provide a ringing sound so as to alert a user in the proximity of node 8a, that a caller is on the line. If neither the handset of the telephone set 7a or the handset at any other node is in the off-hook condition after a predetermined period of time (i.e. 60 seconds), then the on-hold switch 38 and the local bell 42 of the device of node 8a are turned off and the node 8a returns to idle. If someone answers the call at handset to any other node (i.e. nodes 8a, 8b, 8c, 8d, 8e) then the device 10a of node 8a turns off its on-hold switch 38 and its local bell generator 42, and returns to idle.

Since the interface device of node 8a is in the call selection mode, the interface devices of the other nodes 8b, 8c, 8d and 8e are in the call forwarding mode. When the interface device of each of nodes 8b, 8c, 8d, and 8e enter the call forwarding mode, it checks the interface device at each remote node to determine if any handset is in the off-hook condition, or if there is any touch-tone input sequence entered. For example, with respect to the interface device 10b of node 8b, interface device 10b checks the interface device at each of the other "remote" nodes 8a, 8c, 8d and 8e (since, with respect to node 8b, all the other nodes are remote nodes). If no phone at a remote node is in the off-hook condition and there is no touch-tone input sequence for a predetermined period of time (i.e. 60 seconds), the nodes 8b, 8c, 8d and 8e return to idle. However, if there is a touch-tone input sequence and the touch-tone input sequence matches the unique extension code number associated with a node (e.g. node 8b), then a call is being forwarded to node 8b and the interface device 10b begins the call selection operational mode.

Figure 4:
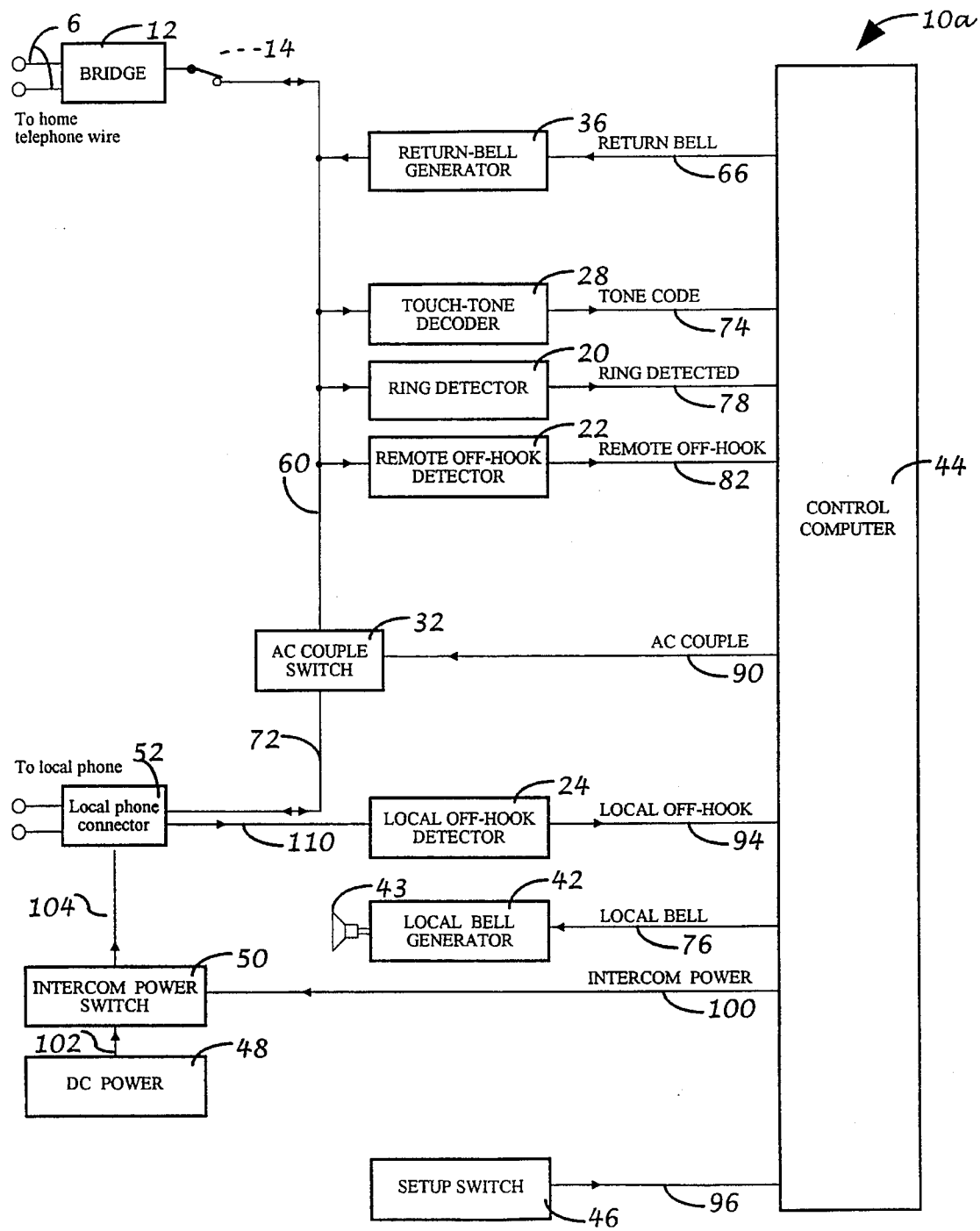

FIG. 4 illustrates the functional block diagram of a node during an intercom operational mode. The intercom operational mode is best understood from the perspective of a calling node, and a called node. For purposes of the following description, node 8b is designated as the calling node, and 8c is the called node. When a user at the calling node 8b desires to make an intercom call he lifts the handset off the handset cradle of the telephone unit 7b thereby turning on the tone decoder 28 at the calling node. If the first touch-tone entered is not a "#" code, the user is making an outgoing call and the calling node 8b returns to idle. If the first touch-tone is a "#" code, then the interface device 10b of the calling node 8b enters the intercom operational mode.

In the intercom operational mode, the AC couple switch 32 of the calling node 8b is turned on so that the central office 1 (FIG. 1) will not detect that the calling node 8b handset is in the off-hook condition. Also, the intercom power switch 50 of the calling node 8b is turned on, and provides power for the handset during the intercom operational mode. The calling node 8b waits until its handset is returned to the on-hook condition. During this time, the user of the calling node 8b is expected to enter the unique extension code number assigned to the called node 8c, and wait for the called node 8c to answer, thereby establishing the intercom call. When the intercom call is completed and the handset of the calling node 8b is returned to the on-hook condition, the calling node 8b turns off the AC couple switch 32 and the intercom power switch 50 and the calling node 8b returns to idle.

If the intercom call is in progress and the ring detector 20 of the calling node 8b monitors the presence of a ring signal from the central office 1 (FIG. 1) thereby indicating an incoming call, then the computer 44 of the calling node 8b turns off the intercom power switch 50 and the AC couple switch 32. Since the handset of the calling node 8b is already in the off-hook condition, the incoming call can be answered by the user of the calling node 8b immediately before the zero node 8a has a chance to answer the call and play the greeting message. The user of the calling node 8b or the outside caller can forward the call to another extension of the network if necessary.

From the perspective of a node that is a potential called node, each potential called node (i.e. nodes 8a, 8c, 8d, 8e) determines, via its remote off-hook detector 22 whether or not a handset of a remote node is in the off-hook condition. That is, each potential called node determines whether or not a handset associated with each of the other nodes in the network is in the off-hook condition. If there is such a remote off-hook condition then each potential called node turns on its touch-tone decoder 28 to monitor for the first touch-tone code. If the first touch-tone code is not a "#" code, then each potential called node returns to the idle condition. However, if the first touch-tone input is "#", then each potential called node compares the subsequently entered touch-tone sequence with its unique extension code. If the two codes do not match then the respective node returns to idle. However, if the codes do match then the node with the matching codes is the called node (e.g. node 8c) and turns on its AC couple switch 32 and its intercom power switch 50 to begin the intercom call. A signal is then sent to the local bell generator 42 of node 8c so that a user of node 8c can hear the ring and answer the intercom call. After the intercom call is answered node 8c waits until the intercom is terminated and its handset is returned to the on-hook condition. During the intercom call, if node 8c detects, via its ring detector 20, that there is a ring signal from the central office 1 (FIG. 1), node 8c will stop the intercom call and answer the incoming call by turning off the AC couple switch 32 and its intercom power switch 50 and thereby begin the incoming call procedure described above.

Figure 5:
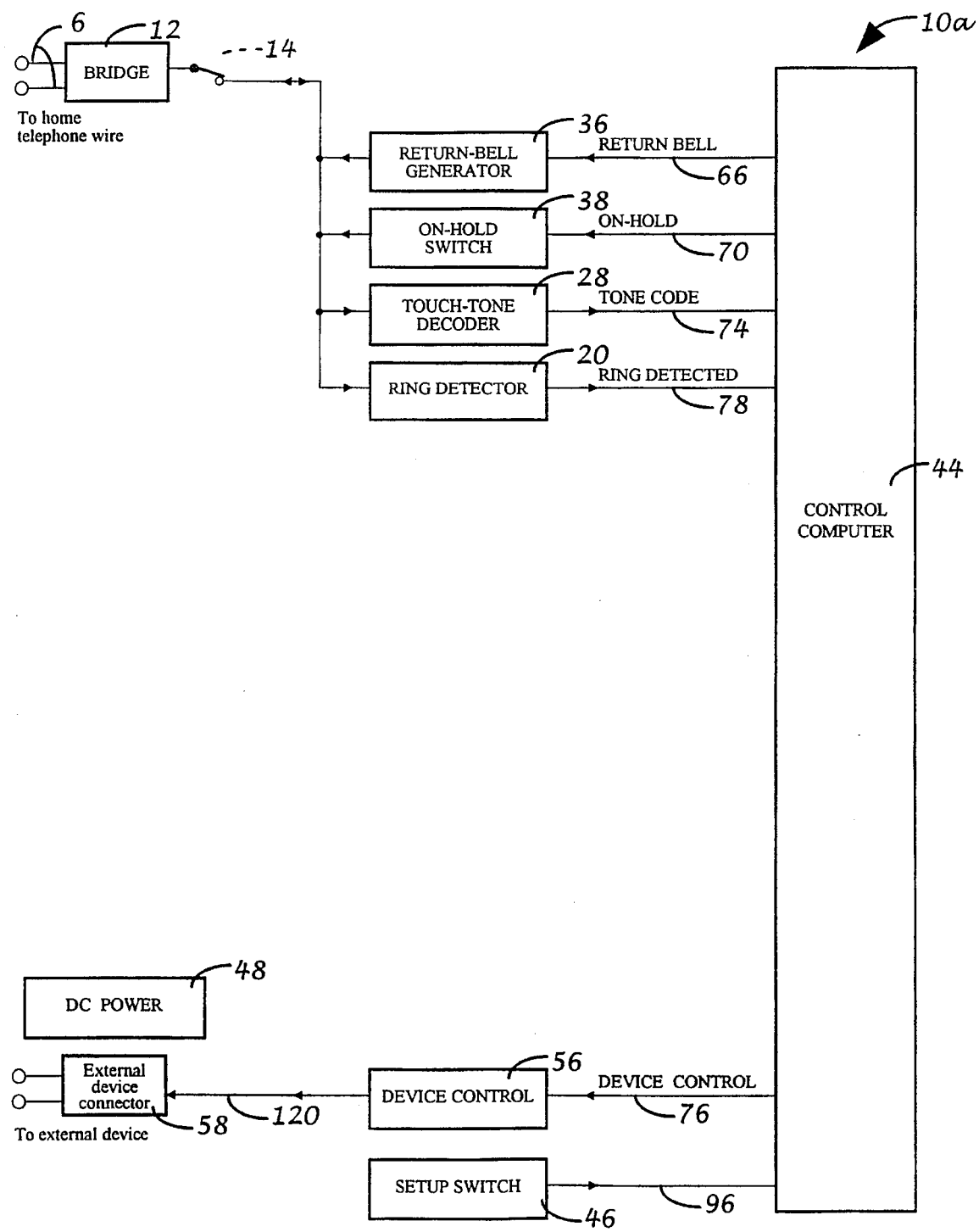

FIG. 5 illustrates the external device control operational mode. Although device 56 of node 8a is illustrated, any node of the network may be designated as an external device control module. When a node is designated as an external device control node, it works as a regular node when there is an incoming call. However, if an external device control node is selected during call selection, the computer 44 of the control node immediately turns on the on-hold switch 38 and awaits a correct password and control command from the calling party. Upon receiving the correct information, as determined by its touch-tone decoder 28, the computer 44 of the external device control node will execute the command and turn off its on-hold switch 38 and return to idle. If the information received is not correct, the external device control node will turn off the on-hold switch 38 and return to idle. In order to execute the command, the control computer 44 of the external device control node commands the device control 56 which signals the external device (not shown) via the external device connector 58.

Figure 6:
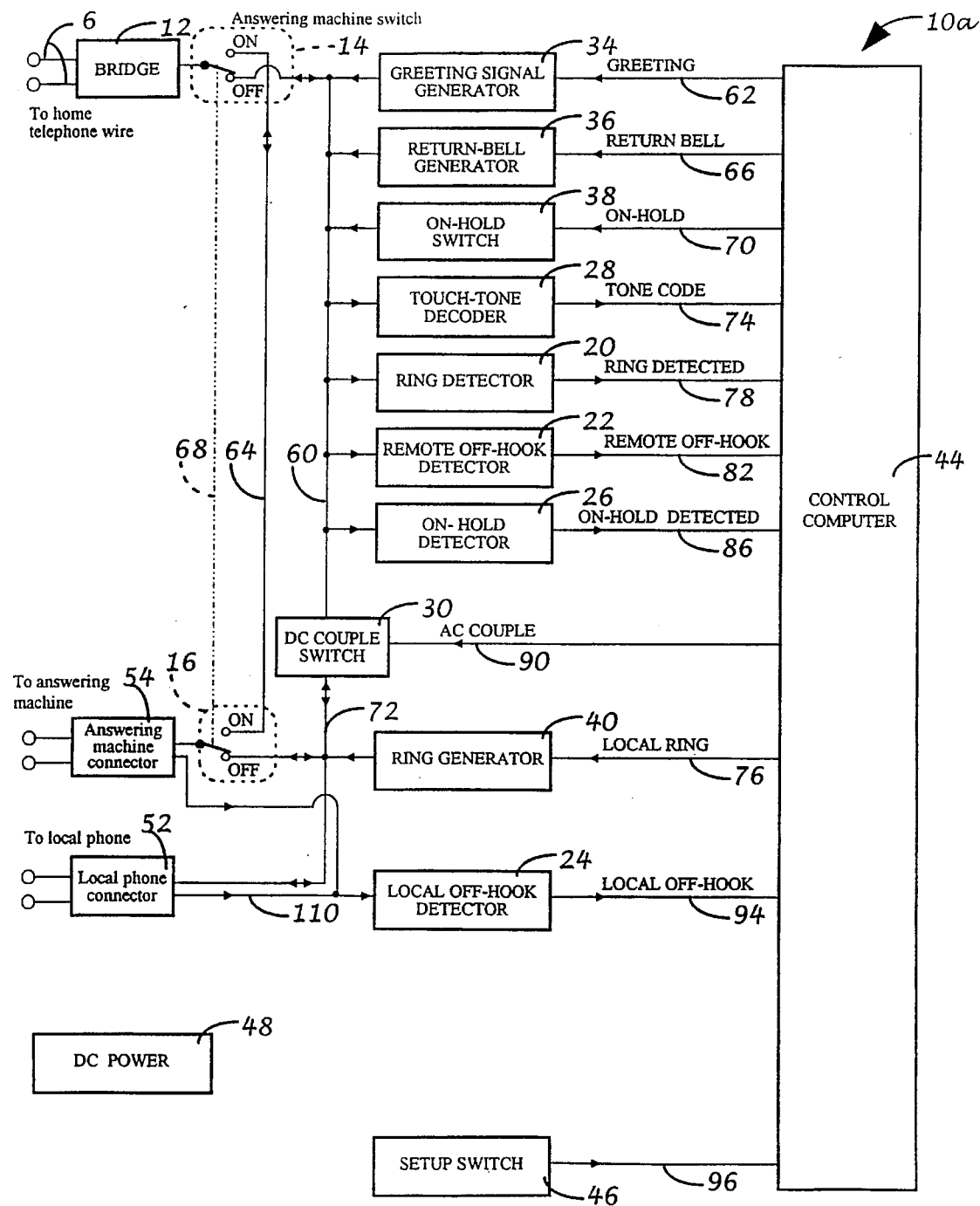

FIG. 6 is a block diagram illustrating the answering machine operational mode of a node. In the preferred embodiment, the answering machine interface is assigned to the zero node or node 8a. When an outside caller selects or enters the unique extension code number associated with node 8a, and after hearing the greeting message, node 8a turns on its on-hold switch 38 and its ring generator 40. The ring generator 40 generates a ring signal that is input to an answering machine (not shown) via the answering machine connector 54. The ring signal is similar to that of a central office ring signal such that the answering machine will answer the ring and record the message. If the answering machine is turned off and does not answer for a predetermined period of time (60 seconds), the on-hold switch 38 is turned off and the zero node or node 8a returns to idle. If the answering machine answers the ring, the zero node or node 8a waits until it is in the on-hook condition then turns off the on-hold switch 38 and returns the node 8a to idle.

Circuit Description

Figure 7:
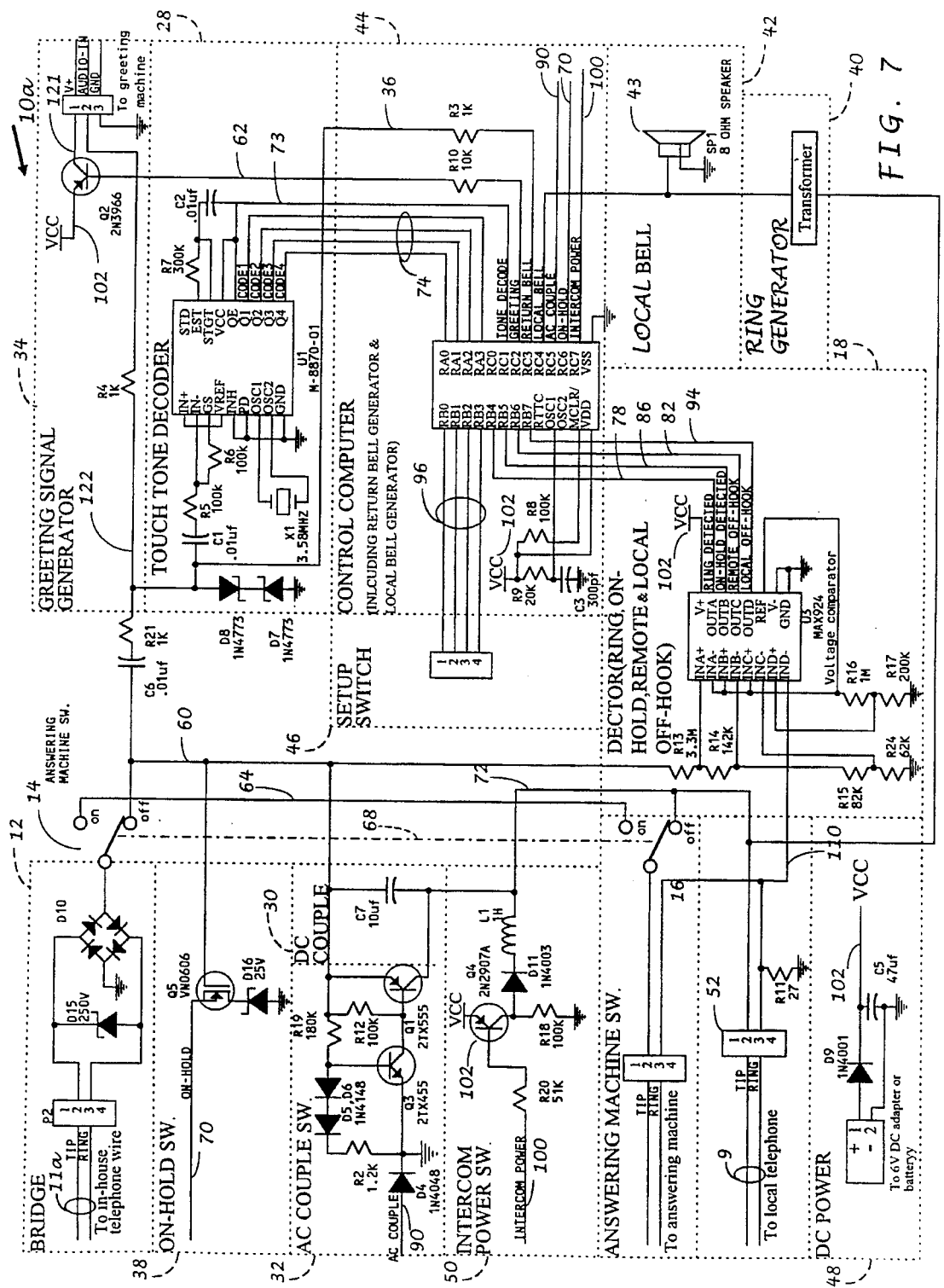
FIG. 7 is a schematic drawing depicting the circuitry of the interface device shown in FIG. 2.

FIG. 7 is a schematic diagram illustrating the circuitry of the device 10 shown in FIG. 2. As in the description above, for purposes of discussion the device 10a will be described, and the node 8a is the local node and all other nodes are remote nodes.

The bridge 12 provides overvoltage protection for the other components of the device 10a, provides polarity protection, and converts ring signals (from the central office) from AC to DC. The bridge 12 is communicatively coupled, via the signal line 60, to each of the on-hold switch 38, the AC and DC couple switches 32 and 30, a detector means 18, the greeting signal generator 34, the control computer 44, and the touch tone decoder 28.

The voltage on the line 60 varies depending on the status of the network. For example, if all the telephone set handsets of each node of the network are in the on-hook condition, then the central office 1 (FIG. 1) maintains the line 60 at approximately 50 volts DC. However, if an outside call is being made, then the central office generates an AC ring signal over the wire 6 and into the bridge 12. The bridge converts the AC ring signal to a DC signal having a peak voltage level greater than 70 volts. Thus, when there is an incoming call, the voltage on the line 60 to rises to a level greater than 70 volts. If any user at any node of the network responds to the incoming call by lifting a telephone handset then the voltage on the line 60 falls to below 15 volts (typically 5–10 volts). When the call is completed and the handset is replaced, then the voltage on the line 60 rises to approximately 50 volts. Finally, if any user desires to make an outgoing call or an intercom call and, therefore, picks up a handset, then the voltage on the line 60 falls to below 15 volts.

The on-hold switch 38 is responsive to an on-hold command signal generated by the computer 44 and transmitted via the signal line 70. When the on-hold command signal is set "high" (or set "true"), a transistor Q5 is turned "on" to cause the voltage of the line 60 to be maintained between 15 and 30 volts (typically 25 volts). A voltage of approximately 25 volts simulates an off-hook condition of a handset of at least one node. The 25 volt level is sufficiently low enough such that the central office will not generate or will stop generating a ring signal.

The significance of the on-hold switch operation is apparent during the call selection operational mode. During the call selection mode, the on-hold switch is turned on (i.e. the transistor Q5 is turned on) and the voltage of line 60 is kept at approximately 25 volts. The line voltage is low enough to stop the central office from sending a ring signal to the device. Since no ring signal is generated, a ring back signal is not sent back to the caller. Since no ring back signal is transmitted, the caller can easily hear the greeting message played by the greeting signal generator 34 of the zero node.

The significance of the on-hold switch operation is also apparent in conjunction with the operation of the AC couple switch 32, during the initiation of a call forwarding operation as described below.

The detector means 18 includes a voltage comparator U3 which functions as the ring detector 20, the remote off-hook detector 22, the on-hold detector 26, and the local off-hook detector 24. The detectors 20, 22, and 26 monitor the voltage on the signal line 60. The detector 20 detects whether or not the central office is sending a ring signal to the node 8a. The detector 26 detects whether or not the on-hold switch 38 is on and whether or not a remote handset is in the off-hook condition. The detector 22 detects whether or not a remote handset is in the off-hook condition.

An AC ring signal has a peak-to-peak voltage level of greater than 70 volts. The bridge 12 converts the AC signal to a DC signal which is transmitted over the line 60 to the comparator U3. The voltage on the line 60 is divided by resistors R13, R14, and R15 and then input to the comparator U3 input terminals INA+, INB−, and INC−, respectively.

An output signal OUTA (i.e. the ring detector output) of the comparator U3 is set "high", i.e. "true", if a ring signal is detected. That is, signal OUTA is set high if the voltage on the line 60 exceeds 70 volts. The OUTA signal is transmitted via the line 78 to the input pin RB4 of the processor U2 of the computer 44.

If none of the remote handsets are in the off-hook condition and the on-hold switch is on, then the voltage of the line 60 drops to between 15 and 30 volts, and the comparator U3 sets an output signal OUTB to high. The OUTB signal is transmitted via the line 86 to the input pin RB5 of the processor U2 of the computer 44.

However, if at least one remote handset is in the off-hook condition, then the voltage of the line 60 drops to below 10 volts and the comparator U3 sets an output signal OUTC to high. The OUTC signal is transmitted over the line 82 to the input pin RB6 of the processor U2 of the computer 44. In the situation when there is at least one remote phone in the off-hook condition and the on-hold switch is on, then both OUTB and OUTC are set to high.

Each of the AC couple and the DC couple switches 32, 30 are communicatively coupled to the bridge 12 via the signal line 60. Each of the AC couple and the DC couple switches 32, 30 are responsive to an AC couple command signal which is transmitted via the line 90 from the control computer 44. If the AC couple command signal is set to "high", or "true", then the AC couple switch 32 is "on" and the DC couple switch 30 is "off". If the AC couple command signal is set to "low" then the AC couple switch 32 is "off" and the DC couple switch 30 is "on".

The DC couple switch 30 is a normally closed (i.e. "on") switch, that provides a signal path for voices when an outside call is in progress. That is, when the DC couple switch 30 is closed ("on") and the AC couple switch 32 is "off", the transistor Q1 is "on" and the local telephone set 7a at node 8a is connected to a remote phone (not shown), via the connector P1, the line 72, the transistor Q1, the line 60, the bridge 12, and the connector P2.

The AC couple switch 32 is a normally open switch, i.e. the switch is normally "off". The AC couple switch 32 is typically turned on, i.e. "closed", during an intercom operational mode. When the AC couple switch 32 is "on", the transistor Q1 is "off" and the local telephone set 7a at node 8a is connected to a remote phone (not shown), via the connector P1, the line 72, the capacitor C7, the line 60, the bridge 12, and the connector P2. However, only the AC portion of the signal passes through the capacitor C7, allowing a voice signal to pass from the local telephone set 7a at node 8a to a remote phone at some remote node. The central office continues to maintain the line 60 at 50 volts. Because the line 60 remains at 50 volts, the handsets at each of the node 8a and the remote nodes can be in the off-hook condition during the intercom and the central office will not detect any off-hook condition. Therefore, the central office will not interfere with the intercom operation with a dial tone. It should be noted that, as described below, during the intercom operation power to generate the voice signals, from one phone set to another, is provided by the intercom power switch 50.

The significance of the AC couple switch 32 and the on-hold switch 38 is also apparent during the initiation of a call forwarding operation. To clearly illustrate the initiation of a call forwarding operation, assume node 8b has been called by an outside caller and the user at node 8b desires to forward the call to a user at node 8c.

The user at node 8b initiates a call forwarding operation by entering, at the keypad of his telephone set 7b, a "##" sequence followed by the unique extension code sequence assigned to node 8c. The computer of node 8b turns on each of the on-hold switch 38 and its AC couple switch 32. The voltage on the line 60 rises from 10 volts to 25 volts. The computer of the node 8b turns on its local bell generator 42 and all the other nodes use their on-hold detector 26 and remote off-hook detectors 22 to determine if any node answers the forwarded call. If the call is answered by any node other than node 8c, then the voltage on line 60 drops to below 10 volts. If the node 8c answers the call, then node 8b turns off its on-hold switch 38 and its AC couple switch 32 to allow a user at node 8c to join the conversation. If the call is not answered, the user at node 8b can enter "##" to cancel the call forwarding. The node 8b turns off its on-hold and its AC couple switches. The line voltage drops from 25 to 10 and the node 8c will stop ringing its local bell upon detecting the voltage change.

The touch tone decoder 28 decodes a touch tone input signal received through the bridge 12 and transmitted through the line 60. The output of the decoder 28 is a decoded touch tone signal which is transmitted, via the pins RA3, RA2, RA1, and RA0, and the touch tone signal line 74, to the control computer 44 for various purposes. A touch tone is generated when a user presses a key on the key pad of a telephone set. Table 1 indicates the output on each of the pins RA0 RA1, RA2 and RA3 that correspond to each of the keys on the key pad of a telephone set. The control computer 44 turns on the touch tone decoder 28, with a +5 v signal transmitter via line 73, only when the computer 44 needs to receive a decoded tone input.

The greeting signal generator 34 provides a signal to enable an outside device, such as an answering machine or an electronic playback device, to play a greeting message. The audio signal from the outside device is sent to an outside caller to greet and instruct the outside caller. Only the zero node, e.g. node 8a, implements this function.

More specifically, a greeting command signal is transmitted from the control computer 44, via a signal line 62, to the transistor Q2 of the greeting signal generator 34. When the greeting command signal is "high", Q2 is turned "on" such that power (VCC) from a battery 48 is transmitted, via the line 121 and a connector P4 to an outside device such as a greeting machine (not shown). The device, when energized, generates an audio signal which is output over a signal line 122 and through the bridge 12 to the outside caller.

The setup switch 46 is used to input the unique extension code number sequence to the control computer 44 as well as other operational parameters (such as the password for the external device control operational modes). The unique extension code sequences and other data is transmitted to the control computer 44 via a signal line 96.

The local bell generator 42 generates an audio signal through a speaker (or buzzer) 43 so that a user, at the node 8a, can pick up the handset of the telephone set 7a and answer an outside call or an intercom call. A control computer 44 generates a pulse (or waveform) to the speaker 43 when the node 8a is selected during call forwarding, call selection, or intercom operations. The speaker 43 outputs an audio sound to a user who is disposed near the node 8a.

The return bell generator 36 is actually an output from the control computer 44. When the local bell generator 42 of the node 8a is ringing, the control computer 44 provides a ring tone signal during call selection or call forwarding for both an outside caller or an intercom caller such that either caller can hear the ring tone. The ring tone signal is output from generator 36, through a resistor R3, and through the bridge 12. If either caller has entered an invalid node number, the caller will not hear the ring tone through the handset. Before the selected node is answered, the caller can hear an audio tone to determine when the handset of the called node (node 8a) is in the off-hook condition. The audio tone is turned off when the control computer 44 detects that the local handset of the telephone set 7a is off the hook. Thus, when the user of node 8a picks up the phone to respond to the ringing bell signal, the audio tone transmitted over the bridge 12 to the caller is ended.

The intercom power switch 50 includes a transistor Q4 which is responsive to an intercom power command signal transmitted from the control computer 44 over the signal line 100. When the transistor Q4 is turned on, local power (VCC) is provided to the local telephone set 7a during an intercom session. As described above, power from the central office is isolated during an intercom session because the AC couple switch 32 is on (i.e. transistor Q1 is off).

The local or DC power 48 supplies power to the node 8a. Specifically, the DC power 48 supplies DC power via the signal line 102 (VCC) to the ring and local off-hook detector, the greeting machine, the control computer, and the intercom power switch.

The function of the local off-hook detector 24 (FIG. 2) is also performed by the comparator U3 of the detector means 18. The voltage on the line 110 is input to IND- of the comparator U3 of the detector means 24. The voltage on the line 110 is generally a function of the voltage on the line 72, of the resistance of the local telephone, and of the resistance of resistor R11. The resistance of R11 is selected such that the voltage on line 110 is always greater than 0.2 volts when the handset of the local phone is in the off-hook condition. However, the resistance R11 is selected small enough such that it will not degrade the quality of the telephone conversation.

If the handset of the telephone set 7a is in the on-hook condition then the voltage on the line 110 is below 0.2 volts (i.e. the voltage on the line 110 is essentially at ground). If a user at the node 8a (the local node) picks up the handset of the telephone set 7a to answer a call, or to initiate an outside call or an intercom call, then the voltage on line 110 rises to above 0.2 volts. When the voltage on line 110, drops below 0.2 volts an output OUTD is set "high" or "true", and when the voltage on line 110, rises above 0.2 volts the output OUTD is set "low" or "false". A signal is transmitted from OUTD to the control computer 44 via the signal line 94.

The control computer 44 includes a microprocessor and supporting circuitry including the control program (as illustrated in FIGS. 8–16). The control computer 44 provides many functions with the help of other functional modules. The control computer monitors the off-hook condition of a handset and the tone generated by a user to execute the functions desirable by the users of the network. The major inputs to the control computer 44 include the set up signals transmitted from the set up switch 46. Another input to the control computer comes from the detector means 18 (i.e. detectors 20, 22, 24, and 26).

The control computer 44 also provides a positive 5 volts to the tone decoder 28 when the control computer 44 needs to know what keys have been entered by a user. The control computer 44 also outputs signals to the greeting signal generator 34, the AC couple switch 32, the on-hold detector 38, the intercom power switch 50, and the local bell generator 42.

The ring generator 40 (FIGS. 2–6) and the external device control 56 (FIGS. 2–6) are alternative embodiments to the preferred embodiment of the present invention. The ring generator 40 is responsive to a command signal transmitted over the signal line 76 from the control computer 44. Responsive to the command signal, the ring generator 40 generates a ring signal similar to the ring signal generated from the central office. The ring signal is transmitted to the answering machine via the answering machine connector 54 and the answering machine switch 16.

The external device control 56 is also responsive to another command transmitted from the control computer 44 over the signal line 76. In response to this command, the external device control 56 transmits a signal to the external device connector 58 and then to the external device (not shown), over the signal line 120.

Method of Operation

Figure 8:
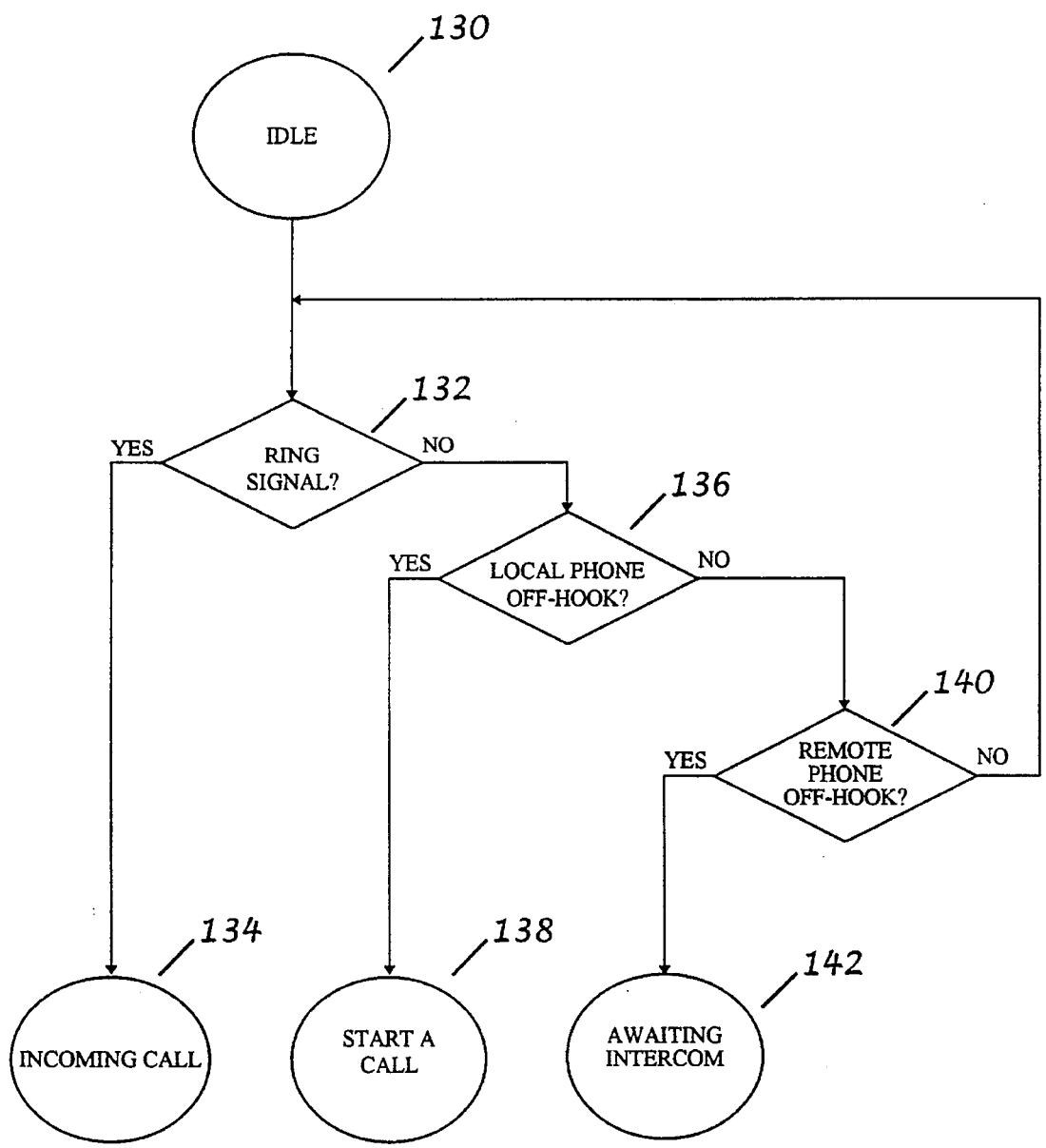
FIGS. 8–18 are flowchart diagrams showing the logic sequence followed by a control computer of the interface device during the various operational modes illustrated in FIGS. 4–7.
Figure 9:
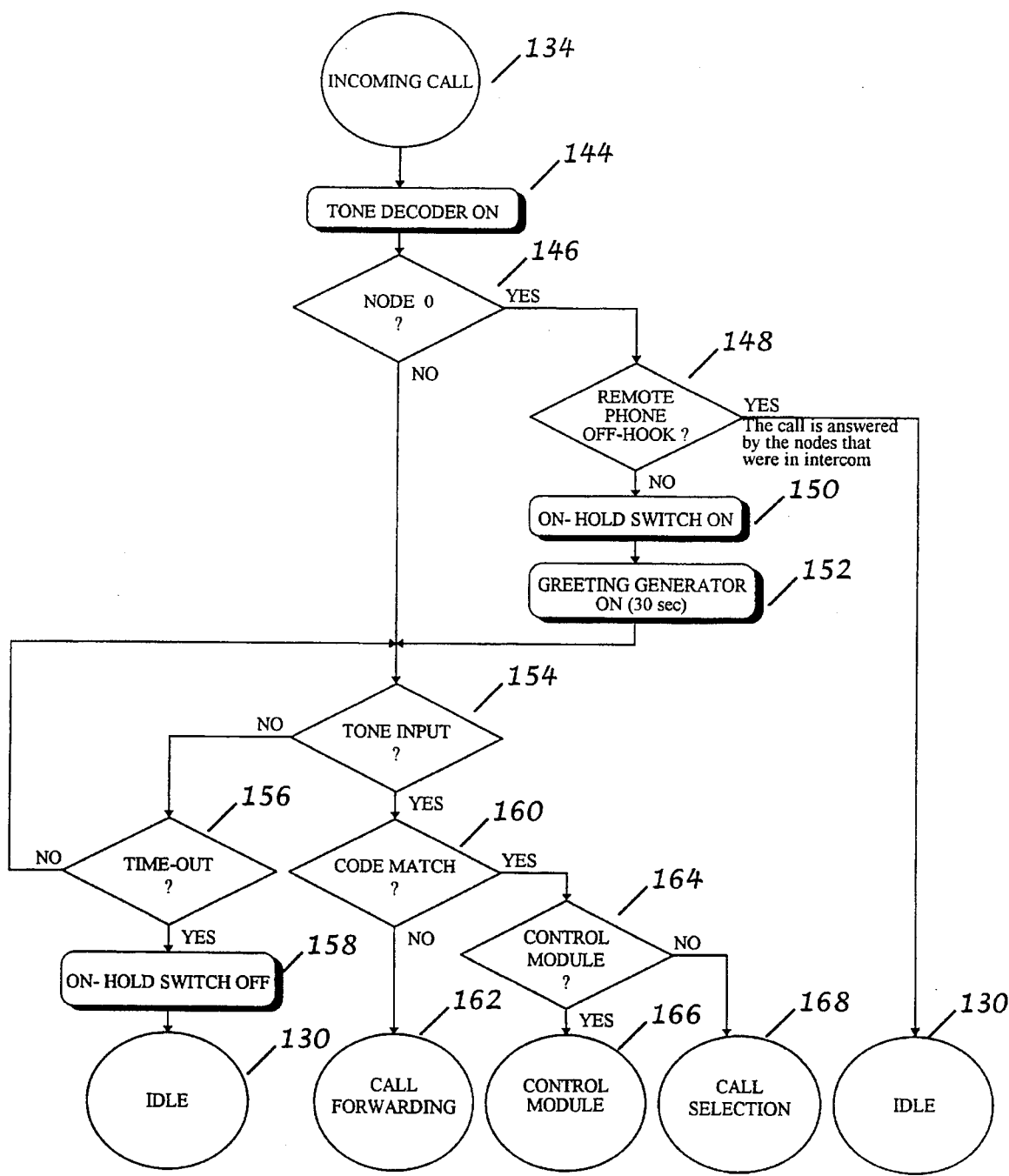
Figure 13:
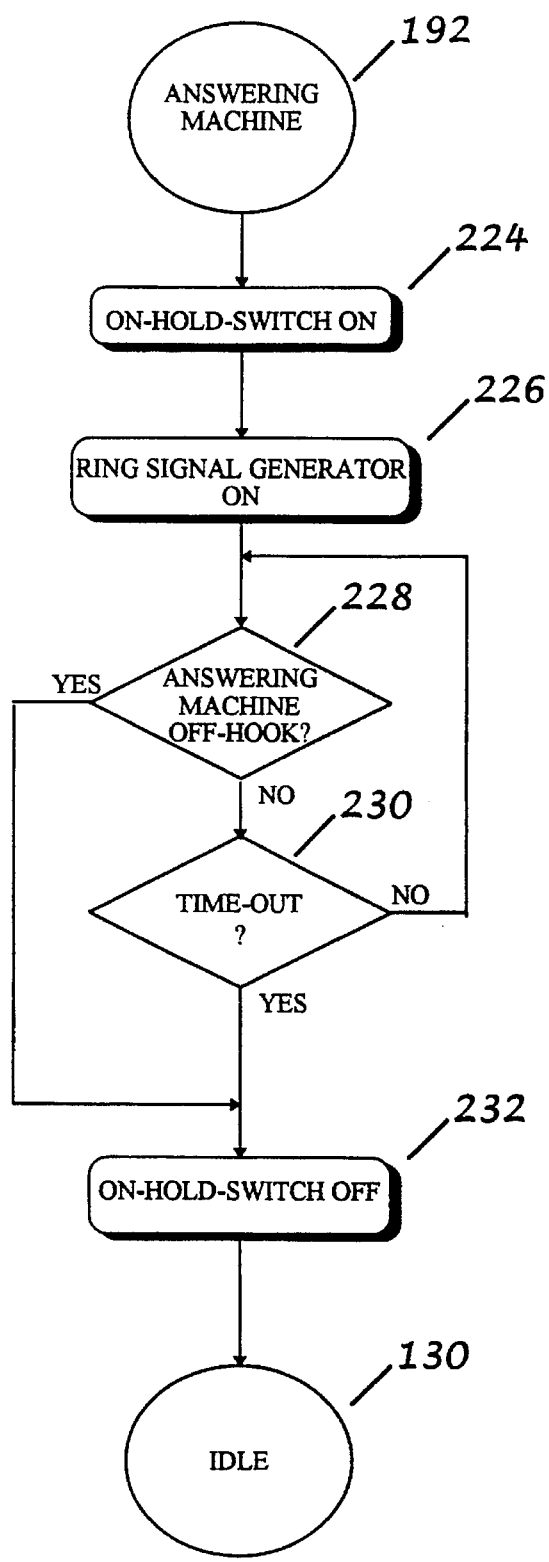
Figure 14:
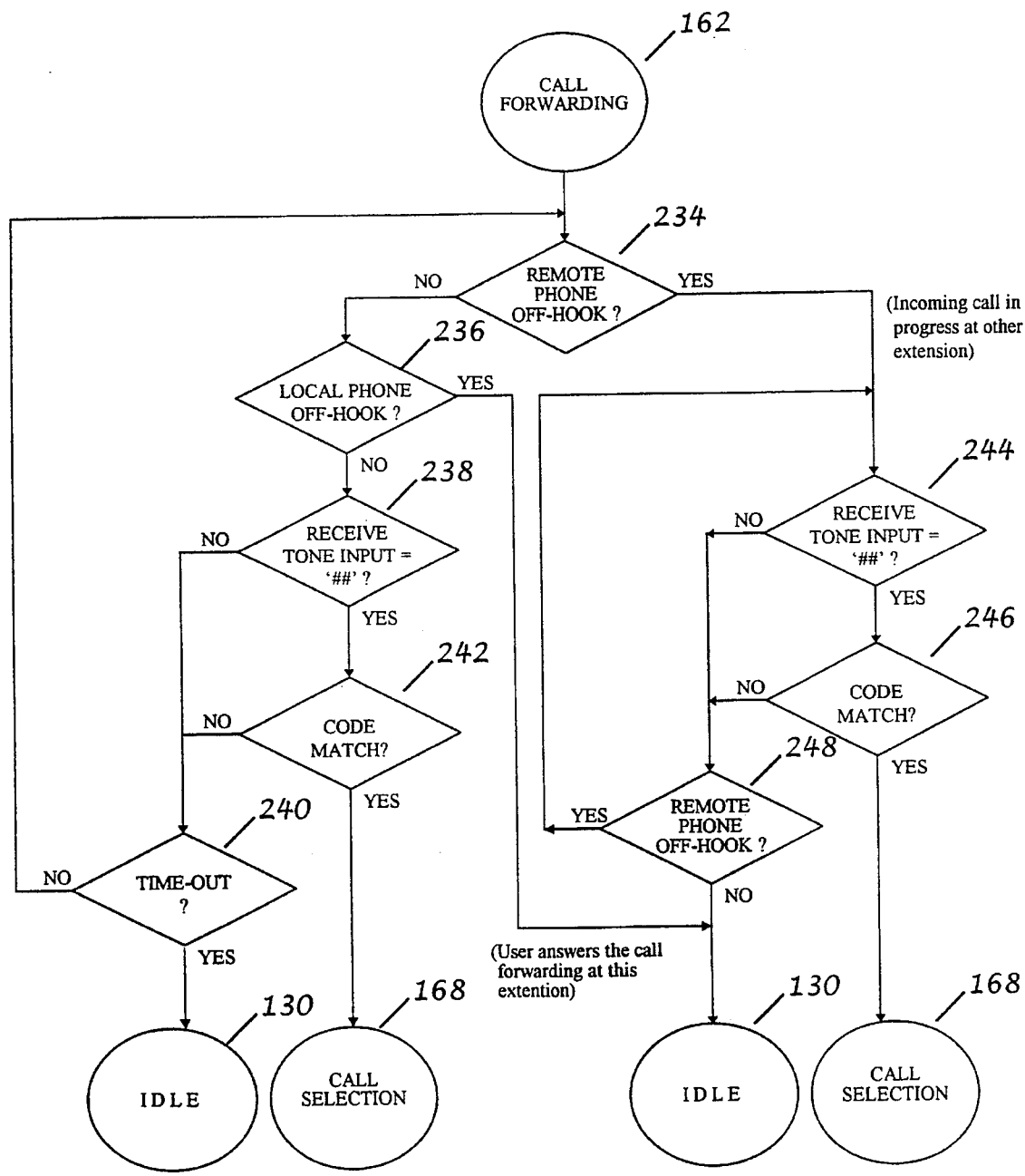
Figure 15:
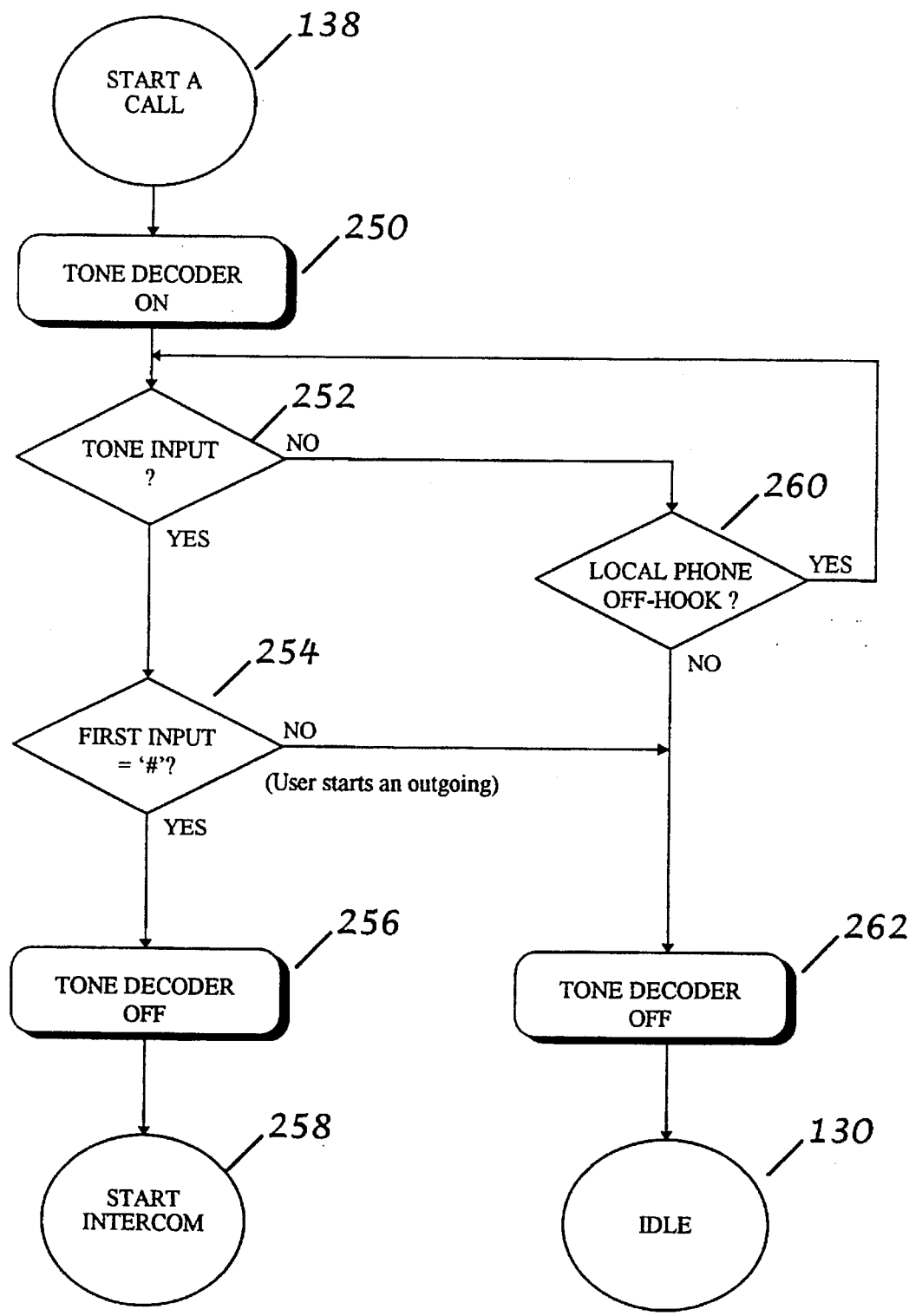

FIGS. 8–18 are flowcharts depicting the detailed operation of the device 10a of network 3. FIG. 8 is a flowchart illustrating the idle loop procedure 130 of the control computer 44 of the device 10a. At step 132, the ring detector 20 senses whether a ring signal has been generated over the line 6. If the ring signal is detected then the control computer goes to the incoming call step 134 (FIG. 9). If there is no ring signal detected then the control computer monitors the local off-hook detector 24 to determine if the local phone 7a is in the off-hook condition. If the local phone is in the off-hook condition then the control computer goes to the step 138 to start a call (FIG. 15). If the local phone is not in the off-hook condition then, at step 140, the control computer determines whether or not a remote phone is in the off-hook condition. If a remote phone is in the off-hook condition then, the control computer goes to step 142 (FIG. 17) to await an intercom call. However, if the remote phone is not in an off-hook condition then the control computer returns to step 132.

FIG. 9 illustrates step 134 wherein an incoming call is handled. Initially, at step 144, the tone decoder is turned on.

Figure 12:
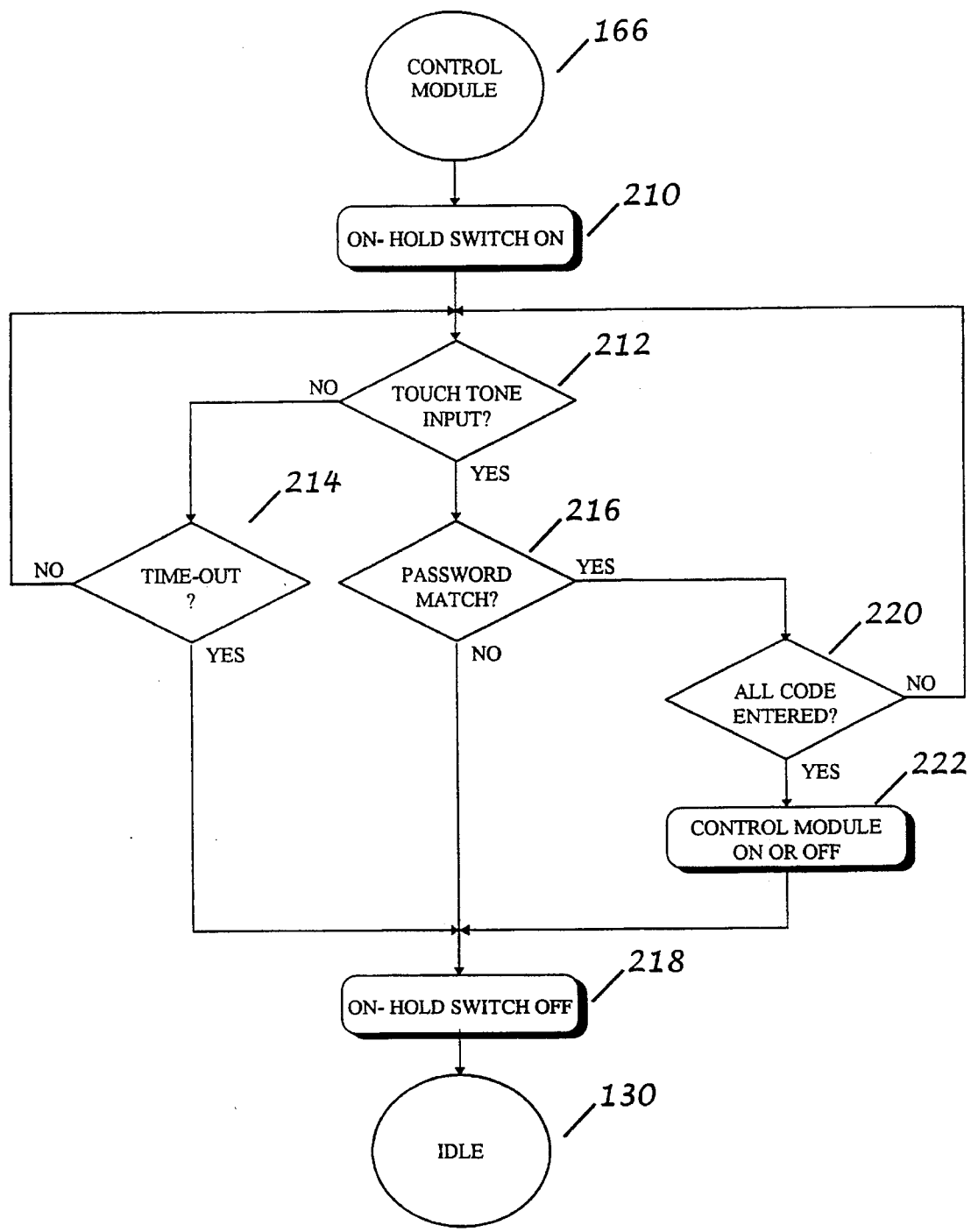

At step 146, if the node 8a is not the zero node then the computer, at step 154, awaits the tone input. If there is no tone input and a predetermined period of time (e.g. 60 seconds) has elapsed, as indicated by step 156, then at step 158, the on-hold switch is turned off and the control computer returns to idle 130 (FIG. 8). If a tone input is received at step 154 and, at step 160, the tone input received does not match the unique extension code number assigned to the node 8a, then the control computer enters the call forwarding mode at step 162 (FIG. 14). However, if the tone input received matches the unique extension code number assigned to node 8a and if node 8a is designated as a control module, then the control computer begins the external device control module mode step 166 (FIG. 12). If, however at step 164, the node 8a is not a designated control module then the computer begins the call selection operational mode at step 168 (FIG. 10).

If node 8a has been designated as the zero node then the control computer determines, at step 148, whether any remote phone is in the off-hook condition. If no remote phone is in the off-hook condition then the on-hold switch is turned on, and the greeting generator is turned on for a predetermined period of time (i.e. 30 seconds), at steps 150 and 152, respectively. The control computer then determines whether or not a tone input has been received as described above in step 154. If, at step 148, the control computer determines that a remote phone is in the off-hook condition, then the control computer begins the idle mode 130 (FIG. 8).

Figure 10:
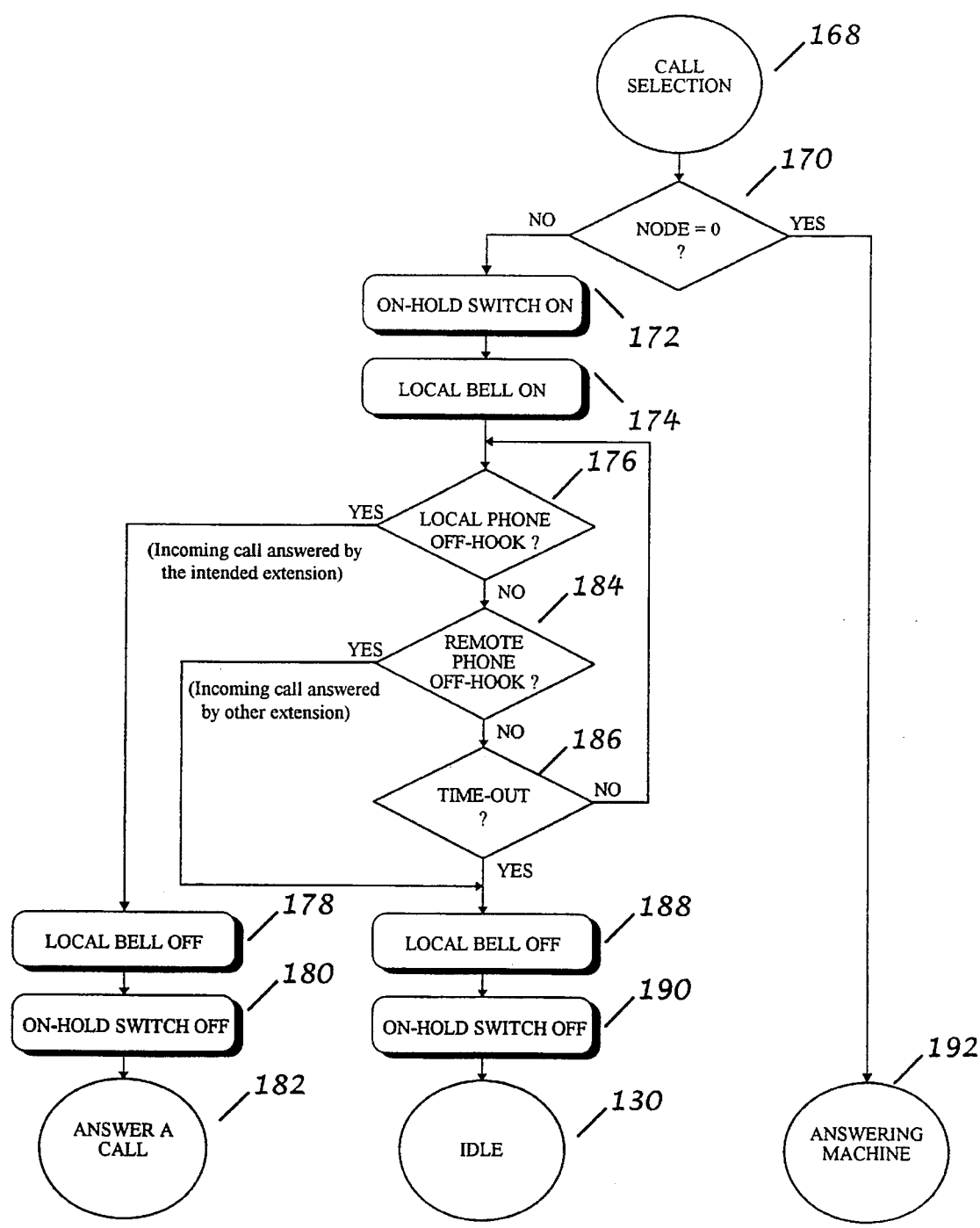

FIG. 10 is a flowchart illustrating the call selection operation mode 168. When the control computer enters into the call selection mode it first determines whether or the node 8a is assigned as the zero node. If node 8a is the zero node then the control computer starts, at 192 (FIG. 13) the answering machine mode. If node 8a is not the zero node then the on-hold switch is turned on (step 172) and the local bell is turned on (step 174). Next, at step 176, the local phone is checked to determine whether or not it is in the off-hook condition. If the local phone is in the off-hook condition, then the incoming call has been answered at node 8a and the local bell is turned off (step 178), the on-hold switch is turned off (step 180), and the control computer enters into the answer a call operational mode at step 182

If, however at step 176, the local phone is not in off-hook condition then, at step 184, the remote phones are checked to see if any of the remote nodes are in the off-hook condition. If there is at least one remote node in the off-hook condition, then the incoming call was answered at that remote node. At step 188, the local bell is then turned off, and, at step 190, the on-hold switch is turned off. The processor then begins the idle mode 130 (FIG. 8).

If at step 184 no remote phones are off-hook, then, at step 186, the control computer continues to monitor for an off-hook condition at either the node or the remote nodes. The monitoring continues until a pre-determined period of time elapses then the node 8a returns to idle 130 (FIG. 8) after the local bell and on-hold switches are turned off, at step 188 and 190, respectively.

Figure 11:
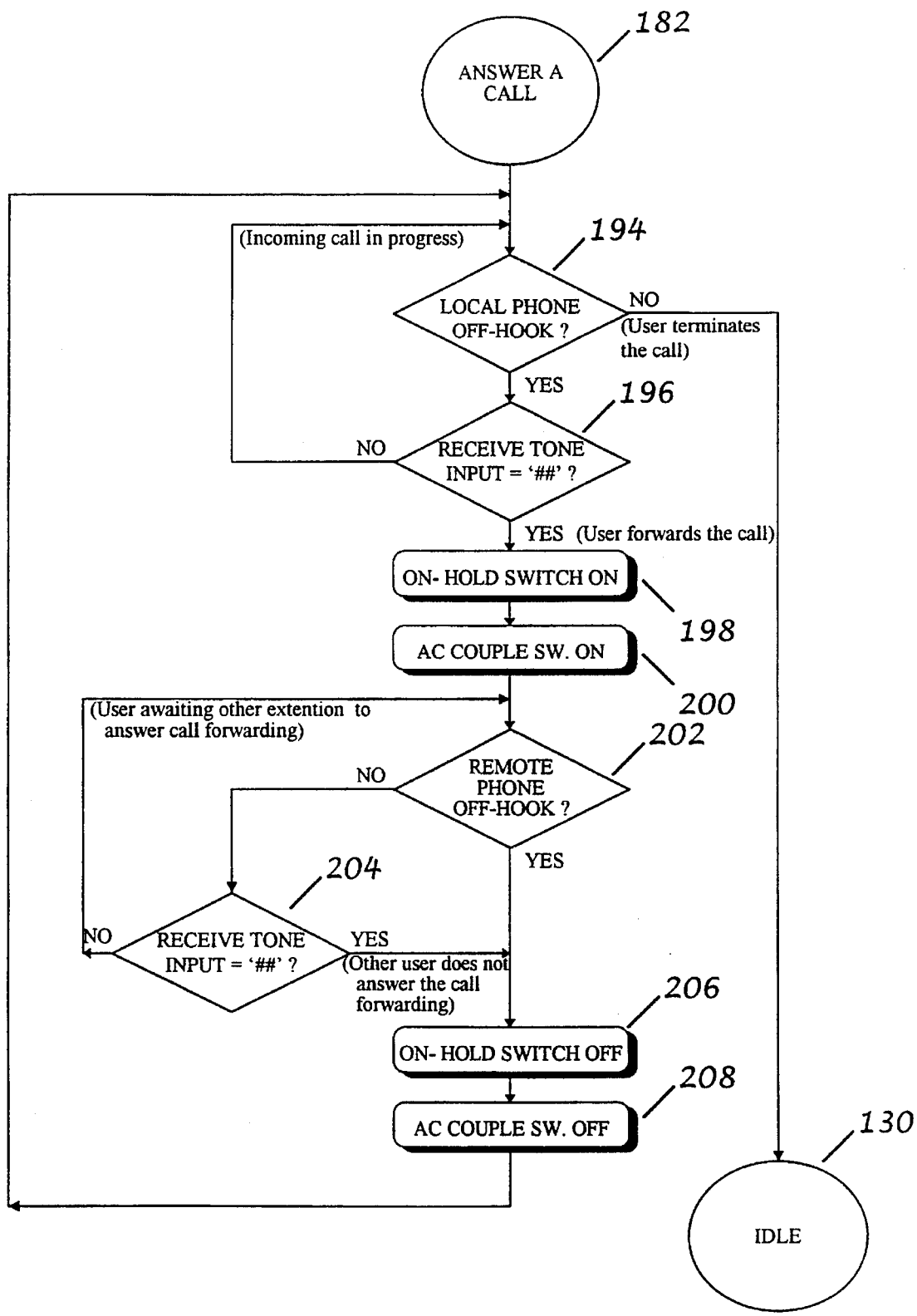

FIG. 11 is a flowchart depicting the operational mode wherein a call is answered or a call forwarded. Initially, at step 194, the local phone is checked to see whether or not it is in the off-hook condition. If the local phone is not off-hook then the call has been terminated, and node 8a returns to idle mode 130 (FIG. 8). If the local phone is off-hook then the control computer waits, at step 196, until the next tone sequence is equal to "##".

When the tone sequence equals "##" the node 8a begins a call forwarding operational mode, and the user of the node 8a begins a call forwarding operation. The on-hold switch is turned on (at step 198) and the AC couple switch is turned on (at step 200). Next, at step 202, the computer checks each remote phone to determine whether or not it is in the off-hook condition. If there is an off-hook remote phone, then node 8a turns off its on-hold switch (step 206) and its AC couple switch (step 208) because a user at another remote node (i.e. 8b, 8c, 8d or 8e) has picked up the handset at the associated telephone set (i.e. 7b, 7c, 7d, or 7e). The local node 8a must only continue to monitor its associated handset for an off-hook condition. This is accomplished by looping back to step 194.

However, if no other remote node is in the off-hook condition then the control computer again checks to determine if a tone input received is equivalent to the sequence "##". If the tone input is not equivalent to the "##" sequence then the node 8a waits for a remote node to answer the call forwarding and therefore, the control computer returns to step 202. If, as indicated at step 204, node 8a does receive a tone input equivalent to the "##" sequence, then the on-hold switch is turned off (step 206), and the AC couple switch is turned off (step 208).

FIG. 12 illustrates the operational sequence that is performed when the node 8a is also designated as an external device control module. Initially, at step 210, the on-hold switch is turned on. Next, at step 212, it is determined whether or not a touch tone input is received. If a touch tone input is not received then, at step 214, a timer is initiated for a predetermined period of time. If there is no touch tone input within the predetermined period of time then the control computer returns again to step 212 to await a touch tone input. If, however, there is no touch tone input received after the predetermined period of time has elapsed, then the on-hold switch is turned off, as indicated at step 218, and the node 8a returns to idle mode 130 (FIG. 8).

If, at step 212, a touch tone input is received within the predetermined period of time, then it is checked at step 216, against a password that has been assigned to node 8a acting as an external device control module. If, at step 216, the password does not match the touch tone input then the on-hold switch is turned off (step 218) and the node 8a returns to idle 130 (FIG. 8). If the password matches with the touch tone input then node 8a awaits for further entry of a code sequence. If the code sequence has not been completely entered then the node continues to wait for touch tone input. If, however, the code has been completely entered then at step 222, the control module operates in the manner designated.

FIG. 13 is a flowchart depicting the operational mode if the node 8a has been designated as the answering machine interface. First, as indicated at step 224, the on-hold switch is turned off. Then, as indicated at step 226, the ring signal generator is turned on. Then, at step 228, it is determined whether or not the answering machine is off the hook. If the answering machine is not off the hook and a predetermined period of time (as indicated at step 230) has not elapsed, then step 228 is repeated. If, however, the answering machine is off-hook then the on-hold switch is turned off, at step 232. Then, node 8a enters the idle mode 130 (FIG. 8).

FIG. 14 illustrates node 8a operating in the awaiting call forwarding operational mode. Initially at step 234, the control computer determines whether or not a remote phone is in the off-hook condition. If there is no remote phone in the off-hook condition then the control computer, at step 236, checks the local phone (i.e. phone 7a) to determine whether or not it is off-hook. If the local phone is off-hook, this signifies that the user of node 8a has answered the forwarded call at node 8a, and the node 8a returns to idle 130 (FIG. 8). If, at step 236, the local phone is not in the off-hook condition, then the node 8a awaits the tone input. When the tone is received it is checked, at step 238, to determine whether or not it is equivalent to the "##" sequence. If the received tone input is not equivalent to the "##" sequence then a timer is started at step 240 and the node 8a returns again to step 234 to check the status of the remote phones. If the predetermined time period has elapsed and node 8a has not received the desired code sequence then it returns to idle 130 (FIG. 8). If the called node, at step 238, has received the "##" sequence and the subsequent code matches the unique extension code assigned to node 8a, then it enters into the call selection mode at step 168 (FIG. 10). However, if the subsequent entered code is not equivalent to the unique extension code assigned to node 8a then it begins the predetermined time period at the step 240.

At step 234, if the remote phone is in the off-hook condition this indicates that an incoming call is in progress at another extension. Therefore, the next step 244 determines whether or not a tone input equivalent to the "##" sequence is received. If the sequence is received and the subsequent input matches the code assigned to the node (as indicated at step 246), then the node enters into the call selection mode at step 168 (FIG. 10). If, however, the received tone is not equal to the "##" sequence or is not equal to the unique extension code assigned to node 8a, then node 8a determines whether or not the remote phone is in the off-hook condition at step 248. If the remote phone is not in the off-hook condition then node 8a returns to idle. If a remote phone is in the off-hook condition then step 244 is repeated.

FIGS. 15–18 illustrate various operational procedures during an intercom call or receiving process. FIG. 15 is a flowchart illustrating the sequence of steps followed to initiate an intercom call or to initiate an outgoing call. At step 250, the tone decoder is turned on. Next, at step 252, the tone input is checked. If there is a tone input, then, at step 254, the first input is checked. If the first input is the "#" sequence then the tone decoder is turned off at step 256 and the control computer begins the intercom process as indicated at 258. If, at step 254, the first input is not the "#" sequence, then this signifies that the user of the calling node (i.e. node 8a) has started an outgoing call and the tone decoder is turned off (step 262) and the node 8a enters into the idle mode 130.

If, at step 252, there is no tone input sensed, then the control computer, at step 260, checks the local phone of node 8a to see if it is in the off-hook condition. If it is not in the off-hook condition then the tone decoder is turned off at step 262 and the node 8a enters into the idle mode 130. If the local phone is in the off-hook condition then step 252 is repeated.

Figure 16:
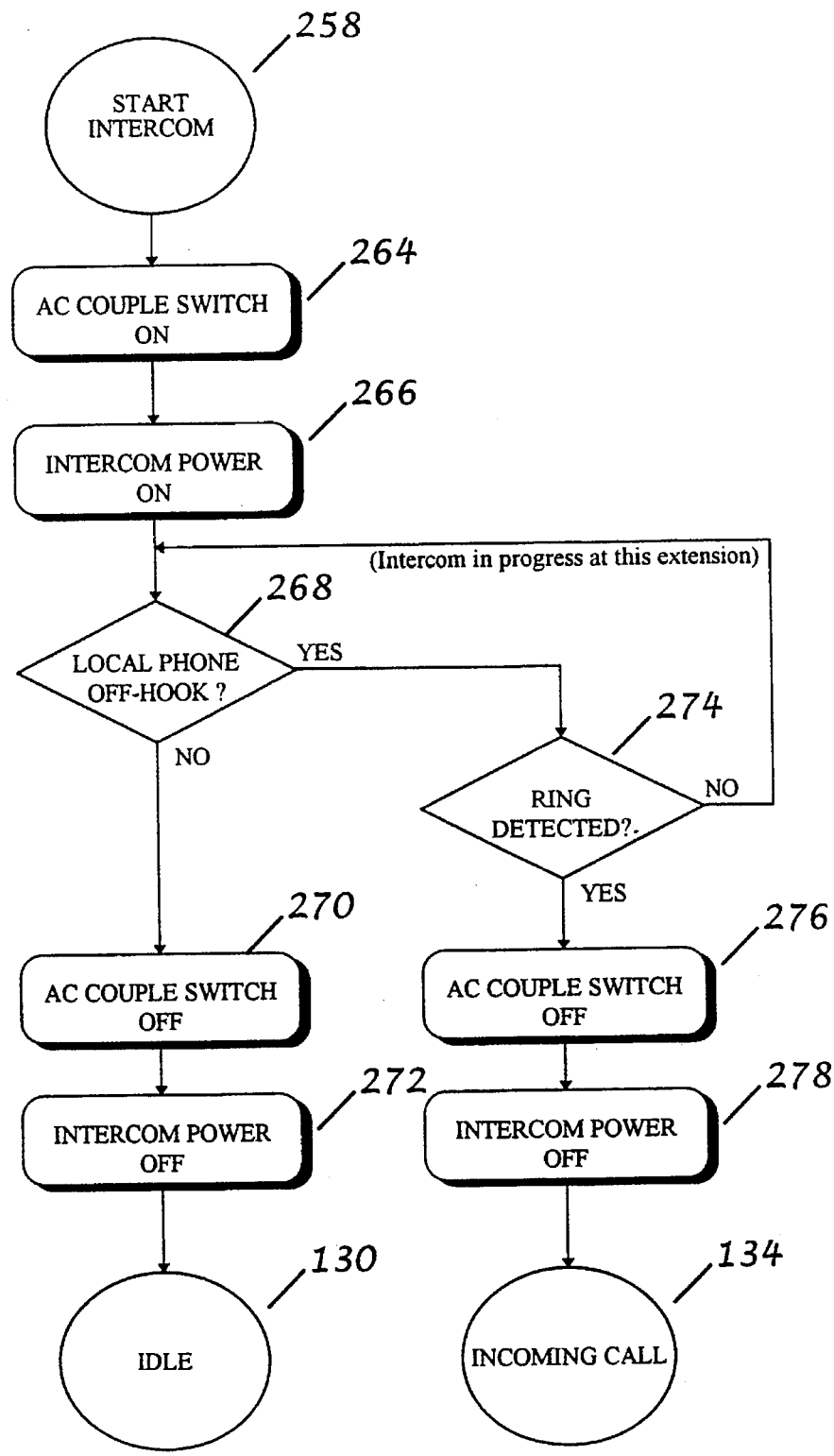

FIG. 16 is a flow chart depicting the steps followed by the calling node (i.e. node 8a) during an intercom procedure. After determining that an extension or an intercom call is to be made then the next step that the control computer of the calling node does is to turn on the AC couple switch, as indicated at 264. Then, at 266, the intercom power switch is turned on. Next, at 268, the local phone is checked to determined whether or not it is in the off-hook condition. If the local phone is not in the off-hook condition then the AC couple switch is turned off (step 270) and the intercom power switch is turned off (step 272). The calling node then returns to the idle mode.

If, at step 268, the local phone is in the off-hook condition and a ring is not detected (step 274), then this indicates that an intercom is in progress at node 8a and the control computer loops to step 268. If at step 274, a ring is detected then the AC couple switch is turned off and the intercom power switch is turned off at steps 276 and 278, respectively. Then the calling node enters into the incoming call operational mode 134 (FIG. 9).

Figure 17:
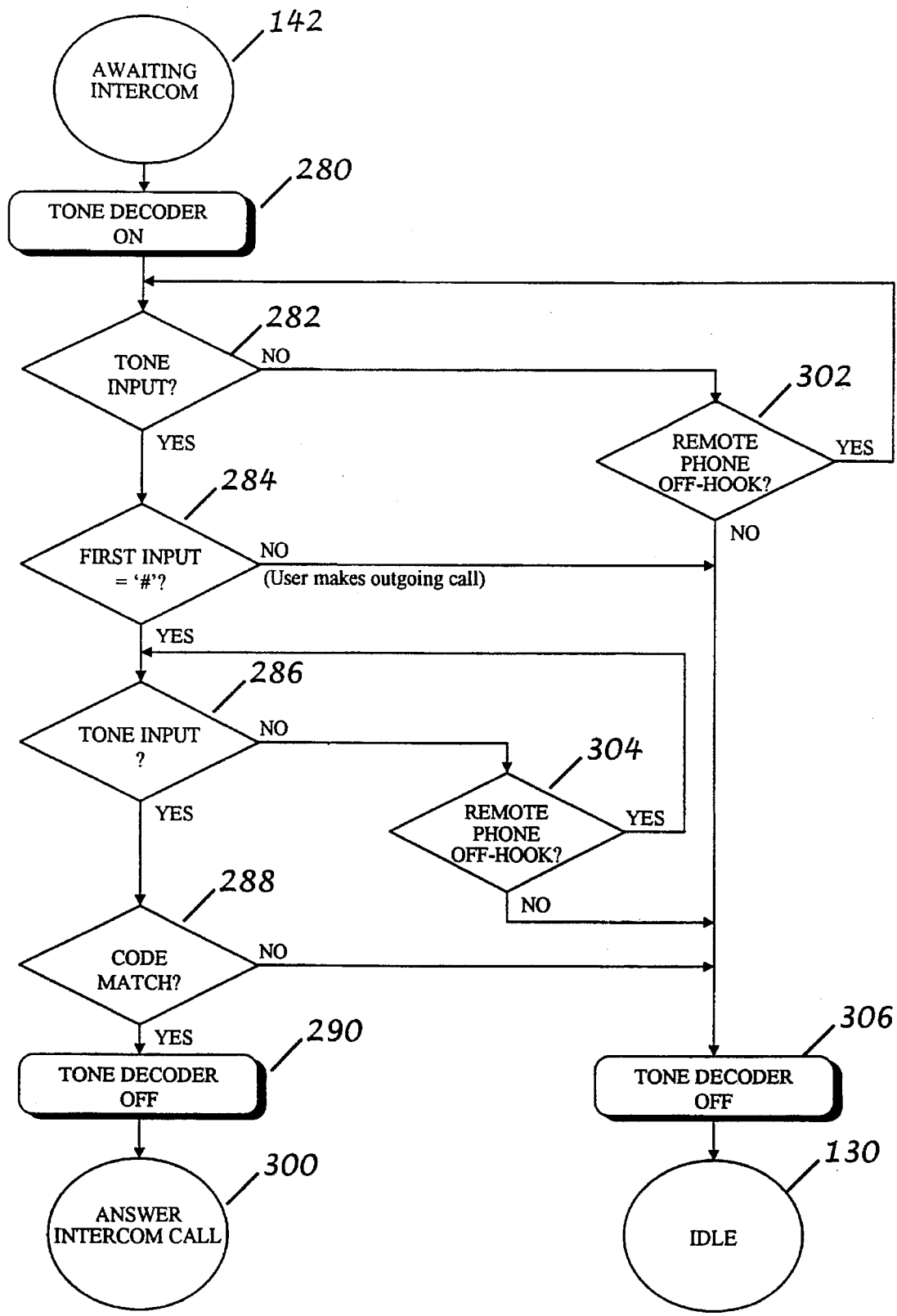
Figure 18:
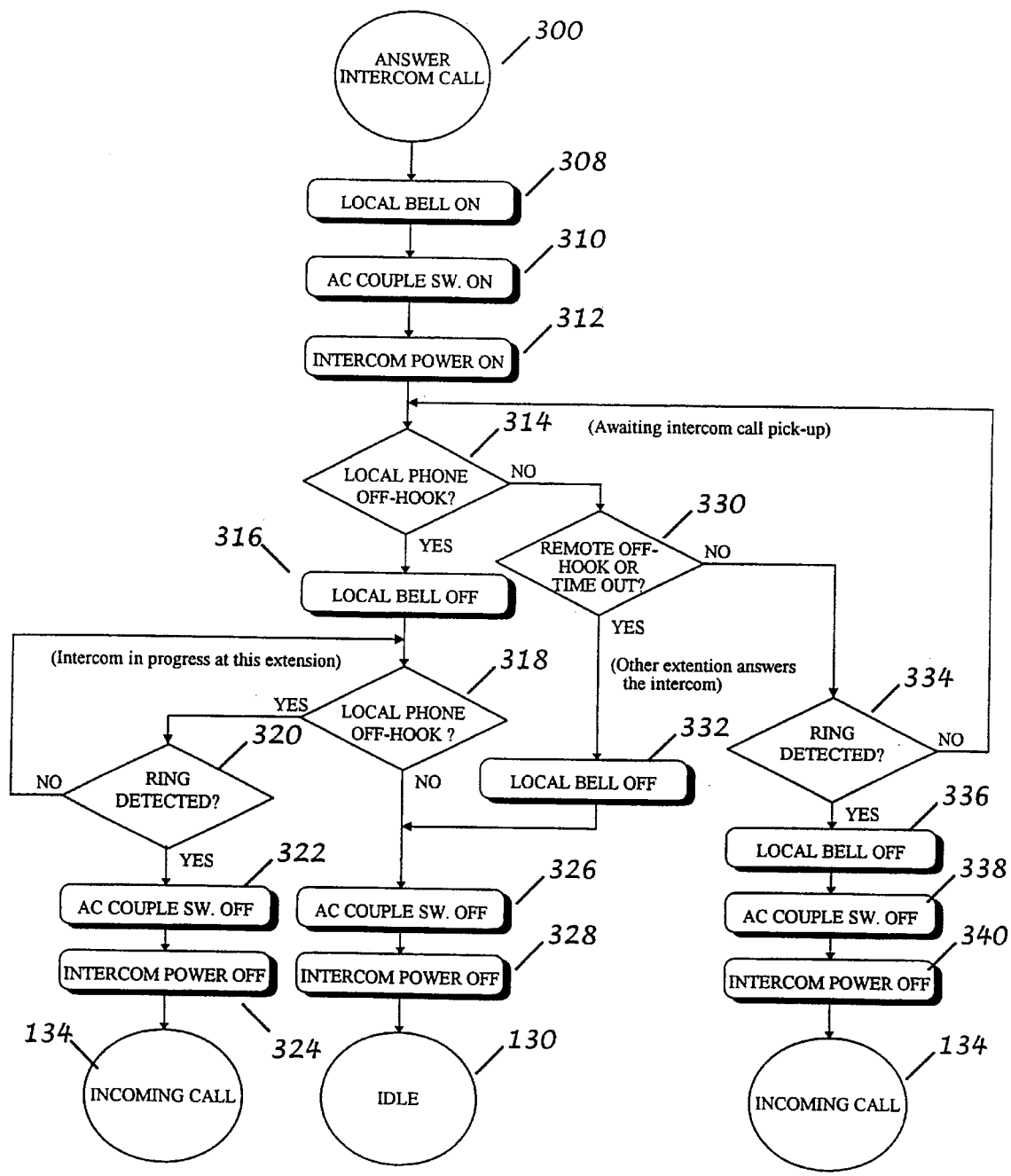

FIG. 17 is a flow chart depicting the operation of the called node (i.e. node 8c) to detect an intercom request over the network. Initially, at step 280, the tone decoder is turned on. Next, at step 282, it is determined whether or not a tone input is received. If a tone input is received and the first input is the "#" (step 284) then it is determined whether subsequent tones are input (step 286). If tone input is received then if, at step 288, the subsequent tone input matches the unique extension code assigned to the called node then the tone decoder is turned off at step 290, and the called node enters into the answer intercom call operation mode as indicated at step 300 (FIG. 18). If, at step 288, the code received is not identical to the unique extension code sequence assigned to the called node, then the tone decoder is turned off (step 306) and the called node enters into the idle mode 130 (FIG. 8).

If, at step 286, no tone input is received then the called node determines, at step 304, whether or not a remote phone is in the off-hook condition. If no remote phone is in the off-hook condition then the called node returns to idle after turning off, at step 306, the tone decoder. If there is a remote phone in the off-hook condition then the called node returns to step 286.

If at step 284 the input sensed is not the "#", this signifies that the user is making an outgoing call and the node returns to idle 130 after turning off the tone decoder, at step 306.

If, at step 282, there is no tone sensed, then a remote phone is checked, at step 302, to see if it is off-hook condition. If a remote phone is not off-hook, then the tone decoder is turned off and the called node returns to idle, but if it is then step 282 is repeated.

FIG. 18 is a flowchart illustrating the operational sequence followed by the called node (e.g. node 8c) during an intercom procedure. At step 308, the local bell is first turned on. At step 310, the AC couple switch is turned on, and at step 312, the intercom power switch is turned on. Next, at step 314, it is determined whether or not the local phone is in the off-hook condition.

If the local phone is in the off-hook condition then, at step 316, the local bell is turned off. Then, at step 318, the local phone is again checked to determine whether or not it is in the off-hook condition. If the local phone is in the off-hook condition then it is determined at step 320, whether or not a ring is detected. If no ring is detected at step 320, then step 318 is repeated. If a ring is detected at step 320, then the AC couple switch is turned off (step 322) and the intercom power switch is turned off (step 324). Then the called node enters into the incoming call mode as indicated previously at step 134 (FIG. 9).

If, at step 318, the local phone is not in the off-hook condition, then the AC couple switch and the intercom power switches are both turned off at steps 326 and 328, respectively. Then the called node enters into the idle mode as indicated previously at step 130 (FIG. 8).

Returning to step 314, if the local phone is not in the off-hook condition then the remote phones are checked, at step 330, to determine if the they are in the off-hook condition, or if a predetermined period of time has elapsed. If one of the remote phones goes into the off-hook condition or if the time out period is exceeded then the local bell is turned off at step 332. The AC couple and the intercom power switches are turned off (steps 326, 328) and the node returns to idle (step 130).

If, at step 330, the remote phones are not in the off-hook condition or the time out period has not elapsed, then it is again determined whether or not a ring is detected (step 334). If a ring is not detected then step 314 is repeated. If a ring is detected then the local bell, the AC couple switch, and the intercom power switch are all turned off at steps 336, 338, and 340 respectively. Then the control computer restarts the incoming call procedure at step 134 (FIG. 9).

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

TABLE 1

| Key | RA3 | RA2 | RA1 | RA0 |
|-----|-----|-----|-----|-----|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |
| * | 1 | 0 | 1 | 1 |
| # | 1 | 1 | 0 | 0 |

We claim:

1. A telephone interface device for use in communicatively coupling each of a plurality of telephone sets and/or answering machines connected in parallel in a local network and to an incoming telephone line from a central office of a telephone service provider, comprising:

a bridge having input terminal for connection to the local network and an output terminal coupled to an internal signal line;

local device terminals for connection to one of said plurality of telephone sets and/or answering machines;

a control computer;

a tone decoder responsive to a tone sequence appearing on said internal signal line, and operative to decode the tone sequence into a plurality of bit signals and to input the bit signals to said computer;

a ring detector communicatively coupled between said internal signal line, and said computer, said ring detector being operative to generate a predetermined voltage for input to said computer if a ring signal is detected on said internal signal line;

a remote off-hook detector communicatively coupled between said internal signal line and said computer, said ring detector being responsive to a voltage appearing on said internal signal line and operative to generate a predetermined voltage for input to said computer if another of said plurality of telephone sets and/or answering machines is in the off-hook condition and causes the voltage to appear on said internal signal line;

coupling switch means for selectively coupling said internal signal line and a circuit node, said coupling switch means being responsive to an AC couple command signal from said computer and operative to toggle between a first state and a second state, wherein in said first state both AC and DC signals are transmitted between said circuit node and said internal signal line, and wherein in said second state only AC signals are transmitted between said circuit node and said internal signal line;

a local phone connector communicatively coupled to said local device terminals and having a ring signal line and a tip signal line, said ring signal line being communicatively coupled to said circuit node; and a local phone off-hook detector communicatively coupled to said computer and to said tip signal line, said local phone off-hook detector being responsive to a voltage appearing on said tip signal line, and operative to generate a voltage for input to said computer if a telephone set coupled to said local device terminals is in an off-hook condition.

2. A telephone interface device as recited in claim 1, and further including:

a power source for generating DC power; and an intercom power switch having an intercom power output line and a power input line, said intercom power output line being communicatively coupled to said tip signal line, said power input line being communicatively coupled to said power source, said intercom power switch further having an intercom command signal input line communicatively coupled to said computer, said intercom power switch being responsive to an intercom command signal transmitted over said intercom command signal line and operative to provide DC power to said tip signal line thereby powering said local telephone set during an intercom calling operation.

3. A telephone interface device as recited in claim 2, and further including:

an on-hold switch coupled between said internal signal line and said computer, and responsive to an on-hold command signal from said computer and operative to maintain the voltage on said internal signal line within a first voltage range; and an on-hold switch detector communicatively coupled between said internal signal line and said computer, said on-hold switch detector being responsive to the voltage on said internal signal line and operative to generate a signal for input to the computer if the voltage on said internal signal line is within said first voltage range.

4. A telephone interface device as recited in claim 3, and further including greeting signal generator means responsive to a signal from said computer and operative to generate a greeting signal for transmission to an outside caller via said internal signal line.

5. A local telephone network, comprising a plurality of interface devices as recited in claim 1, each of said devices being communicatively coupled to a telephone set and/or answering machine and to each other, and to said central office via said incoming telephone signal line, each of said devices having a unique extension code sequence assigned thereto.

6. A telephone interface device as recited in claim 1 and further including a ring generator coupled between said computer and said ring signal line and operative to generate a ring signal on said ring signal line in response to an input from said computer.

7. A telephone interface device as recited in claim 1, and further including:

an on-hold switch coupled between said internal signal line and said computer, and responsive to an on-hold command signal from said computer and operative to maintain the voltage on said internal signal line within a first voltage range; and an on-hold switch detector communicatively coupled between said internal signal line and said computer, said on-hold switch detector being responsive to the voltage on said internal signal line and operative to generate a signal for input to the computer if the voltage on said internal signal line is within said first voltage range.

8. A telephone interface device as recited in claim 1, and further including greeting signal generator means responsive to a signal from said computer and operative to generate a greeting signal for transmission to an outside caller via said internal signal line.

9. A local telephone network as recited in claim 5 and further including:

a power source for generating DC power; and an intercom power switch having an intercom power output line and a power input line, said intercom power output line being communicatively coupled to said tip signal line, said power input line being communicatively coupled to said power source, said intercom power switch further having an intercom command signal input line communicatively coupled to said computer, said intercom power switch being responsive to an intercom command signal transmitted over said intercom command signal line and operative to provide DC power to said tip signal line thereby powering said local telephone set during an intercom calling operation.

10. A local telephone network as recited in claim 9 and further including:

an on-hold switch coupled between said internal signal line and said computer, and responsive to an on-hold command signal from said computer and operative to maintain the voltage on said internal signal line within a first voltage range; and an on-hold switch detector communicatively coupled between said internal signal line and said computer, said on-hold switch detector being responsive to the voltage on said internal signal line and operative to generate a signal for input to the computer if the voltage on said internal signal line is within said first voltage range.

11. A local telephone network as recited in claim 10 and further including greeting signal generator means responsive to a signal from said computer and operative to generate a greeting signal for transmission to an outside caller via said internal signal line.

12. A local telephone network as recited in claim 6 and further including a ring generator coupled between said computer and said ring signal line and operative to generate a ring signal on said ring signal line in response to an input from said computer.

* * * * *